US012698650B2

(12) United States Patent
Jaskiewicz et al.

(10) Patent No.: US 12,698,650 B2
(45) Date of Patent: Aug. 4, 2026

(54) MULTIPOINT LOCK

(71) Applicant: Endura Products, LLC, Colfax, NC (US)

(72) Inventors: Tomasz Jaskiewicz, Oak Ridge, NC (US); George Heid, Charlotte, NC (US); Eric Johnson, Greensboro, NC (US); Adam Kendall, Burlington, NC (US)

(73) Assignee: Endura Products, LLC, Colfax, NC (US)

(*) Notice: Subject to any disclaimer, the term of this patent is extended or adjusted under 35 U.S.C. 154(b) by 0 days.

(21) Appl. No.: 18/886,402

(22) Filed: Sep. 16, 2024

(65) Prior Publication Data

US 2025/0012114 A1 Jan. 9, 2025

Related U.S. Application Data

(63) Continuation of application No. 17/125,173, filed on Dec. 17, 2020, now Pat. No. 12,104,409, which is a (Continued)

(51) Int. Cl.
*E05B 63/14* (2006.01)
*E05B 9/02* (2006.01)
(Continued)

(52) U.S. Cl.
CPC ................ *E05B 63/14* (2013.01); *E05B 9/02* (2013.01); *E05B 15/0013* (2013.01);
(Continued)

(58) Field of Classification Search
CPC ...... E05B 63/14; E05B 63/08; E05B 63/0056; E05B 9/02; E05B 15/0013;
(Continued)

(56) References Cited

U.S. PATENT DOCUMENTS 62,036 A 2/1867 Just
284,381 A 9/1883 Clark
(Continued)

FOREIGN PATENT DOCUMENTS

CA 2987614 C 10/2019
CA 2987618 C 1/2020
(Continued)

OTHER PUBLICATIONS

Amesbury Hardware Products, Tru-Lock, Multi-Point Swing Door Lock, Amesbury Hardware Products Catalog, Sep. 2011, 12 Pages.
(Continued)

*Primary Examiner* — Suzanne L Barrett
(74) *Attorney, Agent, or Firm* — IceMiller LLP

(57) ABSTRACT

A multipoint lock is described. The multipoint lock includes a main latch. The main latch has a latched position where the main latch is configured to extend a first distance from an unhinged edge of a door panel. The main latch is configured to be retractable toward the unhinged edge of the door panel by rotation of a latch drive hub in each of a clockwise direction and a counterclockwise direction relative to a first side of the door panel. The multipoint lock also includes at least one auxiliary latch and a deadbolt drive hub. Rotation of the deadbolt drive hub substantially simultaneously actuates the main latch and the at least one auxiliary latch.

20 Claims, 15 Drawing Sheets

Related U.S. Application Data continuation of application No. 17/125,067, filed on Dec. 17, 2020, now Pat. No. 12,146,344, which is a continuation of application No. 15/828,640, filed on Dec. 1, 2017, now Pat. No. 10,876,324.

(60) Provisional application No. 62/508,460, filed on May 19, 2017.

(51) Int. Cl.

| | |
|---|---|
| ***E05B 15/00*** | (2006.01) |
| ***E05B 47/00*** | (2006.01) |
| ***E05B 59/00*** | (2006.01) |
| ***E05B 63/00*** | (2006.01) |
| ***E05B 63/08*** | (2006.01) |
| ***E05C 9/02*** | (2006.01) |
| ***E05C 9/18*** | (2006.01) |
| ***E05C 9/20*** | (2006.01) |

(52) U.S. Cl.

CPC .......... *E05B 47/0001* (2013.01); *E05B 59/00* (2013.01); *E05B 63/0056* (2013.01); *E05B 63/08* (2013.01); *E05C 9/026* (2013.01); *E05C 9/1875* (2013.01); *E05C 9/20* (2013.01); *E05B 2047/0016* (2013.01); *E05B 2047/0058* (2013.01); *E05B 2047/0061* (2013.01); *E05B 2047/0086* (2013.01)

(58) Field of Classification Search

CPC ................ E05B 47/0001; E05B 59/00; E05B 2047/0016; E05B 2047/0061; E05B 2047/0058; E05B 2047/0086; E05C 9/026; E05C 9/1875; E05C 9/20; Y10T 70/5226; Y10T 70/5235

USPC .................................................... 70/109, 107

See application file for complete search history.

(56) References Cited

U.S. PATENT DOCUMENTS

| | | | |
|---|---|---|---|
| 1,347,251 | A | 7/1920 | Conlon |
| 1,985,176 | A | 12/1934 | Lamb |
| 3,435,644 | A | 4/1969 | Hines |
| 3,659,885 | A | 5/1972 | Nail |
| 3,672,714 | A | 6/1972 | Schultz |
| 3,910,613 | A | 10/1975 | Nolin |
| 3,999,789 | A | 12/1976 | Maurits et al. |
| 4,065,162 | A | 12/1977 | Schlage |
| D259,856 | S | 7/1981 | Ciener |
| 4,353,582 | A | 10/1982 | Eigemeier |
| D273,937 | S | 5/1984 | Ruff |
| 4,850,208 | A | 7/1989 | Weinerman et al. |
| 4,876,783 | A | 10/1989 | Campion et al. |
| 5,290,077 | A | 3/1994 | Fleming |
| 5,394,718 | A | 3/1995 | Hoetzl |
| 5,404,737 | A | 4/1995 | Hoetzl |
| 5,452,928 | A | 9/1995 | Donald |
| 5,474,348 | A | 12/1995 | Palmer et al. |
| 5,490,699 | A | 2/1996 | Uyeda |
| 5,496,082 | A | 3/1996 | Zuckerman |
| 5,524,941 | A | 6/1996 | Fleming |
| 5,564,296 | A | 10/1996 | Theriault et al. |
| 5,685,584 | A | 11/1997 | Baren et al. |
| 5,715,715 | A | 2/1998 | Nunez |
| 5,720,333 | A | 2/1998 | Turvey |
| 5,794,991 | A | 8/1998 | Smallegan et al. |
| 5,918,916 | A | 7/1999 | Kajuch |
| 5,933,086 | A | 8/1999 | Tischendorf et al. |
| 6,152,498 | A | 11/2000 | Lindqvist |
| 6,209,931 | B1 | 4/2001 | Von Stoutenborough et al. |
| 6,217,087 | B1 | 4/2001 | Fuller |
| 6,250,119 | B1 | 6/2001 | Flon |
| 6,266,981 | B1 | 7/2001 | Von Resch et al. |
| 6,282,929 | B1 | 9/2001 | Eller et al. |
| 6,354,121 | B1 | 3/2002 | Frolov |
| 6,443,506 | B1 | 9/2002 | Su |
| 6,478,345 | B1 | 11/2002 | Viney |
| 6,532,779 | B2 | 3/2003 | Shen |
| 6,557,909 | B2 | 5/2003 | Morris |
| 6,688,656 | B1 | 2/2004 | Becken |
| 6,732,557 | B1 | 5/2004 | Zehrung |
| 6,793,253 | B2 | 9/2004 | Bruwer et al. |
| 6,929,293 | B2 | 8/2005 | Toenges |
| 6,971,686 | B2 | 12/2005 | Becken |
| 7,025,394 | B1 | 4/2006 | Hunt |
| 7,051,561 | B2 | 5/2006 | Moon et al. |
| D554,473 | S | 11/2007 | Flory |
| 7,303,215 | B2 | 12/2007 | Moon et al. |
| 7,353,637 | B2 | 4/2008 | Harger et al. |
| 7,421,868 | B2 | 9/2008 | Matyko et al. |
| 7,497,486 | B1 | 3/2009 | Davis et al. |
| 7,520,152 | B2 | 4/2009 | Sabo et al. |
| 7,526,933 | B2 | 5/2009 | Meekma |
| 7,634,928 | B2 | 12/2009 | Hunt |
| 7,656,857 | B2 | 2/2010 | Thubert et al. |
| 7,677,067 | B2 | 3/2010 | Riznik et al. |
| 7,701,331 | B2 | 4/2010 | Tran |
| 7,707,862 | B2 | 5/2010 | Walls et al. |
| 7,752,875 | B2 | 7/2010 | Constantinou et al. |
| 7,849,718 | B2 | 12/2010 | Ambrass |
| 7,856,857 | B2 | 12/2010 | Tsai |
| 7,878,034 | B2 | 2/2011 | Alber et al. |
| 7,926,315 | B2 | 4/2011 | Poletti |
| 7,946,080 | B2 | 5/2011 | Ellerton et al. |
| 8,035,479 | B2 | 10/2011 | Tran |
| 8,061,166 | B2 | 11/2011 | Tsai |
| 8,146,392 | B2 | 4/2012 | Toepfer |
| 8,161,780 | B1 | 4/2012 | Huml |
| 8,199,011 | B2 | 6/2012 | Lu |
| 8,343,308 | B2 | 1/2013 | Tian et al. |
| 8,358,197 | B2 | 1/2013 | Tran |
| 8,382,166 | B2 | 2/2013 | Hagemeyer et al. |
| 8,398,126 | B2 | 3/2013 | Nakanishi et al. |
| 8,419,087 | B2 | 4/2013 | Shen |
| 8,534,099 | B2 | 9/2013 | Chow et al. |
| 8,534,100 | B2 | 9/2013 | Tsai |
| 8,540,288 | B2 | 9/2013 | Tsai |
| 8,550,506 | B2 | 10/2013 | Nakanishi et al. |
| D697,386 | S | 1/2014 | Dooley |
| 8,628,126 | B2 | 1/2014 | Hagemeyer et al. |
| 8,772,970 | B2 | 7/2014 | Lambrou |
| 8,839,562 | B2 | 9/2014 | Madrid |
| 8,899,635 | B2 | 12/2014 | Nakanishi et al. |
| 8,973,416 | B2 | 3/2015 | Terei et al. |
| 8,997,535 | B2 | 4/2015 | Jeffries |
| 9,057,210 | B2 | 6/2015 | Dumas et al. |
| 9,074,391 | B2 | 7/2015 | Van Parys |
| 9,074,392 | B2 | 7/2015 | Berger |
| 9,098,953 | B2 | 8/2015 | Kincaid et al. |
| 9,169,666 | B2 | 10/2015 | Hodgin |
| 9,169,668 | B2 | 10/2015 | George |
| 9,212,506 | B2 | 12/2015 | Murphy et al. |
| 9,218,696 | B2 | 12/2015 | Dumas et al. |
| 9,222,286 | B2 | 12/2015 | Uyeda |
| 9,235,942 | B2 | 1/2016 | Chen et al. |
| 9,284,750 | B2 | 3/2016 | Maeng et al. |
| 9,317,984 | B2 | 4/2016 | Cregg et al. |
| 9,322,194 | B2 | 4/2016 | Cheng et al. |
| 9,322,195 | B2 | 4/2016 | Ainley et al. |
| 9,322,201 | B1 | 4/2016 | Cheng et al. |
| 9,326,094 | B2 | 4/2016 | Johnson et al. |
| 9,334,676 | B2 | 5/2016 | Lambrou et al. |
| 9,336,637 | B2 | 5/2016 | Neil et al. |
| 9,342,936 | B2 | 5/2016 | Scalisi |
| 9,361,741 | B2 | 6/2016 | Robertson et al. |
| 9,378,596 | B2 | 6/2016 | Shen et al. |
| 9,378,597 | B2 | 6/2016 | Shen et al. |
| 9,378,598 | B2 | 6/2016 | Dumas et al. |
| 9,382,739 | B1 | 7/2016 | Johnson et al. |
| 9,396,599 | B1 | 7/2016 | Mallhotra |
| 9,406,180 | B2 | 8/2016 | Eberwine et al. |

(56) References Cited

U.S. PATENT DOCUMENTS

| | | | |
|---|---|---|---|
| 9,428,937 | B2 | 8/2016 | Tagtow et al. |
| 9,428,940 | B1 | 8/2016 | Patrick |
| 9,435,142 | B2 | 9/2016 | Carpenter et al. |
| 9,435,143 | B2 | 9/2016 | Shen |
| 9,437,062 | B2 | 9/2016 | Ahearn et al. |
| 9,440,017 | B2 | 9/2016 | Rohde et al. |
| 9,441,401 | B2 | 9/2016 | Nardelli et al. |
| 9,447,609 | B2 | 9/2016 | Johnson et al. |
| 9,470,017 | B1 | 10/2016 | Cheng et al. |
| 9,472,034 | B2 | 10/2016 | Ahearn et al. |
| 9,500,007 | B2 | 11/2016 | Lambrou et al. |
| 9,501,880 | B2 | 11/2016 | Handville et al. |
| 9,501,883 | B2 | 11/2016 | Handville et al. |
| 9,502,884 | B2 | 11/2016 | Ghisla et al. |
| 9,506,278 | B2 | 11/2016 | Mattrisch |
| 9,512,643 | B1 | 12/2016 | Keefe |
| 9,514,585 | B2 | 12/2016 | Ahearn et al. |
| 9,524,601 | B1 | 12/2016 | Dumas |
| 9,528,294 | B2 | 12/2016 | Johnson et al. |
| 9,528,296 | B1 | 12/2016 | Cheng et al. |
| 9,530,262 | B2 | 12/2016 | Johnson |
| 9,530,264 | B2 | 12/2016 | Caterino et al. |
| D777,558 | S | 1/2017 | Magee |
| 9,534,420 | B1 | 1/2017 | Cheng et al. |
| 9,536,363 | B2 | 1/2017 | Ahearn et al. |
| 9,539,755 | B2 | 1/2017 | Morin et al. |
| 9,546,504 | B2 | 1/2017 | Overgaard |
| 9,551,173 | B2 | 1/2017 | Helisten |
| 9,574,372 | B2 | 2/2017 | Johnson et al. |
| 9,580,931 | B2 | 2/2017 | Myers et al. |
| 9,580,934 | B2 | 2/2017 | Baty et al. |
| 9,593,516 | B2 | 3/2017 | Nakanishi et al. |
| 9,613,476 | B2 | 4/2017 | Johnson |
| 9,613,478 | B2 | 4/2017 | Dumas et al. |
| 9,617,757 | B2 | 4/2017 | Lowder |
| 9,624,695 | B1 | 4/2017 | Cheng et al. |
| 9,624,701 | B2 | 4/2017 | Taylor et al. |
| 9,625,917 | B2 | 4/2017 | Boyer |
| 9,628,814 | B2 | 4/2017 | Kim et al. |
| 9,631,400 | B2 | 4/2017 | Liu et al. |
| 9,631,920 | B2 | 4/2017 | Goldenson |
| 9,637,957 | B2 | 5/2017 | Hagemeyer et al. |
| 9,640,004 | B2 | 5/2017 | Lowder |
| 9,644,398 | B1 | 5/2017 | Cheng et al. |
| 9,652,917 | B2 | 5/2017 | Johnson et al. |
| 9,702,168 | B2 | 7/2017 | Jadallah et al. |
| 9,758,997 | B2 | 9/2017 | Hagemeyer et al. |
| D806,517 | S | 1/2018 | Kessler |
| D846,367 | S | 4/2019 | Romero, Jr. |
| 10,876,324 | B2 | 12/2020 | Jaskiewicz et al. |
| 11,111,698 | B2 | 9/2021 | Mitchell et al. |
| D1,026,613 | S | 5/2024 | Heid et al. |
| 12,104,409 | B2 * | 10/2024 | Jaskiewicz ................ E05C 9/20 |
| 12,146,344 | B2 * | 11/2024 | Jaskiewicz .......... E05B 47/0001 |
| 2006/0000247 | A1 | 1/2006 | Moon et al. |
| 2006/0267357 | A1 | 11/2006 | Semtilli |
| 2008/0211239 | A1 | 9/2008 | Keller |
| 2012/0280789 | A1 | 11/2012 | Gerhardt et al. |
| 2013/0176107 | A1 | 7/2013 | Dumas et al. |
| 2013/0234453 | A1 | 9/2013 | Murphy et al. |
| 2014/0002236 | A1 | 1/2014 | Pineau et al. |
| 2014/0069154 | A1 | 3/2014 | Dolev |
| 2014/0077929 | A1 | 3/2014 | Dumas et al. |
| 2014/0089097 | A1 | 3/2014 | Byun et al. |
| 2014/0292481 | A1 | 10/2014 | Dumas et al. |
| 2014/0340196 | A1 | 11/2014 | Myers et al. |
| 2015/0176311 | A1 | 6/2015 | Picard et al. |
| 2015/0184425 | A1 | 7/2015 | Ellis et al. |
| 2015/0252595 | A1 | 9/2015 | Hagemeyer et al. |
| 2015/0308155 | A1 | 10/2015 | Eller et al. |
| 2016/0017638 | A1 | 1/2016 | Dore Vasudevan et al. |
| 2016/0060904 | A1 | 3/2016 | Dore Vasudevan et al. |
| 2016/0189459 | A1 | 6/2016 | Johnson et al. |
| 2016/0273243 | A1 | 9/2016 | Geringer et al. |
| 2016/0312504 | A1 | 10/2016 | Marsh |
| 2016/0319569 | A1 | 11/2016 | Johnson et al. |
| 2016/0328901 | A1 | 11/2016 | Johnson |
| 2016/0350988 | A1 | 12/2016 | Malhotra |
| 2016/0362914 | A1 | 12/2016 | Carpenter et al. |
| 2017/0002586 | A1 | 1/2017 | Lee |
| 2017/0030112 | A1 | 2/2017 | Kane |
| 2017/0032597 | A1 | 2/2017 | Johnson |
| 2017/0032602 | A1 | 2/2017 | Cheng et al. |
| 2017/0053468 | A1 | 2/2017 | Johnson |
| 2017/0053469 | A1 | 2/2017 | Cheng et al. |
| 2017/0058579 | A1 | 3/2017 | Wolf et al. |
| 2017/0152681 | A1 | 6/2017 | Chiou et al. |
| 2018/0202194 | A1 | 7/2018 | Jaskiewicz et al. |
| 2021/0102406 | A1 | 4/2021 | Jaskiewicz et al. |
| 2021/0102407 | A1 | 4/2021 | Jaskiewicz et al. |

FOREIGN PATENT DOCUMENTS

| | | | |
|---|---|---|---|
| CN | 2716434 | Y | 8/2005 |
| DE | 3612761 | A1 | 10/1987 |
| DE | 10139675 | A1 | 2/2003 |
| DE | 202012007916 | U1 | 10/2012 |
| EP | 0942135 | A1 | 9/1999 |
| EP | 1182312 | A2 | 2/2002 |
| EP | 1340871 | A2 | 9/2003 |
| EP | 1464783 | A2 | 10/2004 |
| EP | 2264263 | A2 | 12/2010 |
| EP | 2468989 | A2 | 6/2012 |
| FR | 3028547 | A1 | 5/2016 |
| GB | 2323626 | A | 9/1998 |
| GB | 2358668 | A | 8/2001 |
| GB | 2400135 | A | 10/2004 |
| GB | 2483888 | A | 3/2012 |
| WO | 9214895 | A1 | 9/1992 |
| WO | 2003095774 | A1 | 11/2003 |
| WO | 2004025057 | A1 | 3/2004 |
| WO | 2005105165 | A1 | 11/2005 |
| WO | 2014108263 | A1 | 7/2014 |
| WO | 2017068518 | A1 | 4/2017 |

OTHER PUBLICATIONS

August Smart Lock & Smarter Homes Access Products, http://august.com/, May 19, 2017, 3 Pages.

Danalock V3—smarten up your home, https://danalock.com/index.html, May 19, 2017, 5 Pages.

Lark-Wi Index, Video Smart Lock Smart Keypad Fob App Cloud Solution Product Comparison, http://lark-wi.com/website/Index.html, May 19, 2017, 16 Pages.

Schlage Sense Smart Deadbolt, http://schlage.com/en/home.html, May 19, 2017, 4 Pages.

Unikey Residential Access, Smart Lock Pioneer, http://www.unikey.com/industries/residential/, May 19, 2017, 4 Pages.

* cited by examiner

MULTIPOINT LOCK

CROSS-REFERENCE TO RELATED APPLICATION

This application is a Continuation of U.S. patent application Ser. No. 17/125,173, filed Dec. 17, 2020, which is a Continuation of U.S. patent application Ser. No. 17/125,067, filed Dec. 17, 2020, which is a Continuation of U.S. patent application Ser. No. 15/828,640 also Patent No.: Ser. No. 10,876,324, filed Dec. 1, 2017, which claims the benefit of U.S. Provisional Patent Application Ser. No. 62/508,460, filed May 19, 2017, the entire contents of which are hereby incorporated by reference.

FIELD OF THE DISCLOSURE

The present disclosure relates to a multipoint lock for moveable closures, particularly door panels, that are secured relative to a frame in a closed position.

BACKGROUND

Homeowners and business owners often prefer multipoint locks for securing their entry door panels. Multipoint locks include spaced apart latches or bolts, which traditionally provide a more secure retention of the door panel compared to using a single cylindrical latch. Multipoint locks may also improve upon the retention of door panels that include a cylindrical latch combined with a conventional deadbolt placed in close proximity to the cylindrical latch. Multipoint locks can also improve the alignment between the door panel and the frame, leading to an improved seal against water and air infiltration.

As shown in FIG. 1, prior art multipoint locks for entry door applications typically use multipoint hardware 10 consisting of a set of handle levers 12, a thumb turn 14, a key cylinder 16, and a pair of escutcheons 18. The multipoint hardware 10 is typically designed specifically for use with a multipoint lock. For example, handle levers 12 frequently are used instead of knobs to increase the torsional mechanical advantage when rotating the handle, because significant operational forces are typically required to drive the plurality of latches or bolts of a multipoint lock. In some instances, the handle levers 12 facilitate separate functions whether the handle lever is rotated upward or downward.

As a result of requiring multipoint hardware 10 that is specific to multipoint locks, availability and design variety of the multipoint hardware can be limited compared to the widely available single point cylindrical lock hardware on the market. FIGS. 2A and 2B show a typical knob 20 for a cylindrical latch according to a first embodiment. The knob 20 includes an asymmetric spindle 22. FIGS. 3A and 3B show a typical knob 30 for a cylindrical latch according to a second embodiment. The knob 30 has a square shaped spindle 32. Each knob 20, 30 may have a spring associated therewith to return the knob to a home position when released by a user. FIG. 4 shows an alternative hardware configuration for a cylindrical latch that includes thumb actuated hardware 40 with a thumb latch 42.

FIG. 5 shows door panel 50 in a closed position. The door panel 50 may be pre-bored with a first through bore 52 configured to allow hardware to interface with a cylindrical latch. The door panel 50 may also include a second pre-bored through bore 54 configured to allow hardware to interface with a cylindrical deadbolt. FIGS. 6A and 6B show detailed views of the door panel 50. The on-center distance M (FIG. 6B) between the first and second through bores 52, 54 is typically standardized as 5-½ inches. The setback distance SB (FIG. 6B) between the center of each through bore 52, 54 and the unhinged edge 56 (FIG. 6A) of the door panel 50 is typically standardized as 2-⅜". In one embodiment, the door panel 50 is constructed from wood, but may also be formed in whole or in part by steel, fiberglass, or other suitable materials. The door panel 50 is hinged to a door frame 60. The door frame 60 may include some or all of a header, one or more jambs, an astragal, a mullion, and a sill. Known multipoint locks may not be suitable for use with the door panel 50 because the through bores 52, 54 are not at appropriate locations for multipoint lock hardware. As a result, multipoint locks are traditionally incorporated into custom door panels, further reducing the availability and design variety available to homeowners.

For one or more of the reasons mentioned above, there are opportunities to create improved multipoint locks.

SUMMARY

One embodiment of the present disclosure includes a multipoint lock. The multipoint lock includes a main latch. The main latch has a latched position where the main latch is configured to extend a first distance from an unhinged edge of a door panel. The main latch is configured to be retractable toward the unhinged edge of the door panel by rotation of a latch drive hub in each of a clockwise direction and a counterclockwise direction relative to a first side of the door panel. The multipoint lock also includes at least one auxiliary latch and a deadbolt drive hub. Rotation of the deadbolt drive hub substantially simultaneously actuates the main latch and the at least one auxiliary latch.

A multipoint lock according to another embodiment of the present disclosure includes a main latch. The main latch has a latched position where the main latch is configured to extend a first distance from an unhinged edge of a door panel. The main latch is configured to be retractable relative to the unhinged edge of the door panel by rotation of a latch drive hub in each of a clockwise direction and a counterclockwise direction relative to a first side of the door panel. The multipoint lock also includes at least one auxiliary latch configured to be extendable from the door panel to a deadbolt position by rotation of a deadbolt drive hub in a first direction. The main latch is configured to be extended from the latched position to the deadbolt position when the at least one auxiliary latch is extended to the deadbolt position thereof. The main latch is configured to extend a second distance from the unhinged edge of the door panel in the deadbolt position thereof, the second distance being greater than the first distance.

A multipoint lock according to another embodiment of the present disclosure also includes a main latch with a latched position. The main latch is configured to extend a first distance from an unhinged edge of a door panel in the latched position. The main latch is configured to be retractable toward the unhinged edge of the door panel by rotation of a latch drive hub in each of a clockwise direction and a counterclockwise direction relative to a first side of the door panel. The multipoint lock also includes at least one auxiliary latch, a deadbolt drive hub, and a drive plate including an actuation slot. The deadbolt drive hub comprises a deadbolt lever pivotably attached to a link arm. A distal end of the link arm comprises a pin configured to reside at least partially within the actuation slot. Rotation of the deadbolt lever creates vertical translation of the drive plate to facilitate substantially simultaneous motion of the main latch and the at least one auxiliary latch.

These and other aspects of the present invention will become apparent to those skilled in the art after a reading of the following description of the preferred embodiments, when considered in conjunction with the drawings. It should be understood that both the foregoing general description and the following detailed description are explanatory only and are not restrictive of the invention as claimed.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

Figure 5:
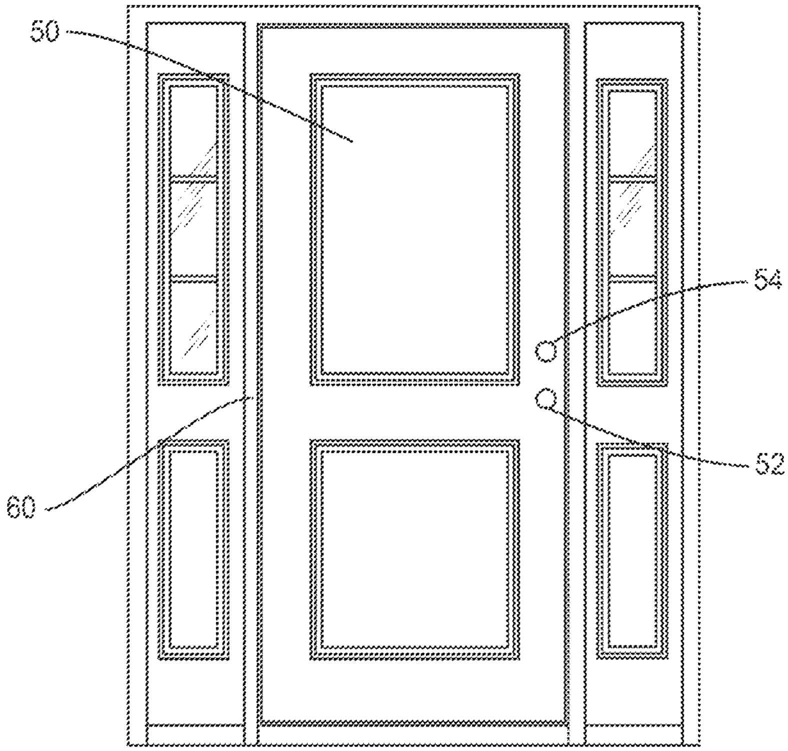
FIG. 5 PRIOR ART
FIG. 5 shows a prior art pre-bored door panel within a door frame.
Figures 6A, 6B:
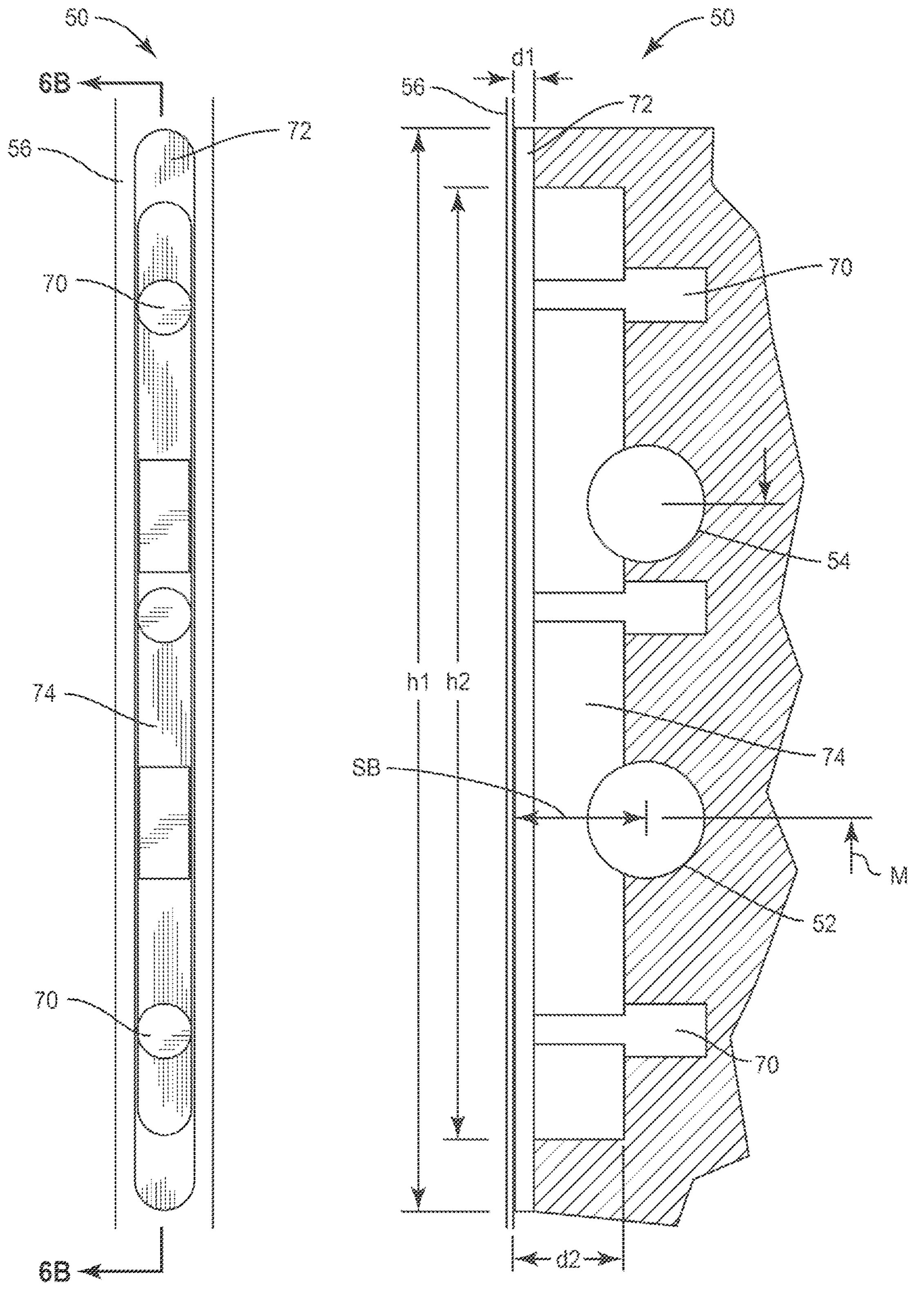
FIGS. 6A and 6B show a detailed end view and cross sectional side view, respectively, of a door panel modified for use with a multipoint lock of the present disclosure.

In one embodiment, and as illustrated in FIGS. 5, 6A, and 6B, the present disclosure seeks to provide a multipoint lock suitable for use with a door panel 50 with pre-bored through bores 52, 54 configured for a cylindrical latch and cylindrical deadbolt. Designing a multipoint lock for such use is advantageous because it provides the user access to a greater variety of door panel options. With reference to FIGS. 6A and 6B, a door panel 50 intended for use with a cylindrical latch and cylindrical deadbolt as shown in FIG. 5 may be prepared for a multipoint lock according to embodiments of the present disclosure with one or more modifications. To prepare the unhinged edge 56, which is the edge adjacent to the through bores 52, 54, for accepting a multipoint lock, a step may include creating one or more recesses 70 perpendicular to and centered on a minor axis of the unhinged edge 56. The recesses 70 may be sized, shaped, and spaced to correspond with auxiliary latches, or the housings thereof, of a multipoint lock. A first slot 72 may be formed into the unhinged edge 56, centered on the minor axis of the edge, and having a first depth d1 and a first height h1. The first slot 72 may be configured for accepting a lock channel and an optional face plate of the multipoint lock. At least a second slot 74 may be formed into the unhinged edge 56, centered on the minor axis of the edge, and having a second depth d1 and a second height h2. The second slot 74 may be configured to receive a mortise box of the multipoint lock. Therefore, the second depth may be greater than the first depth measured perpendicular to the unhinged edge 56. The second height may be less than the first height measured along the unhinged edge 56.

Figure 2A:
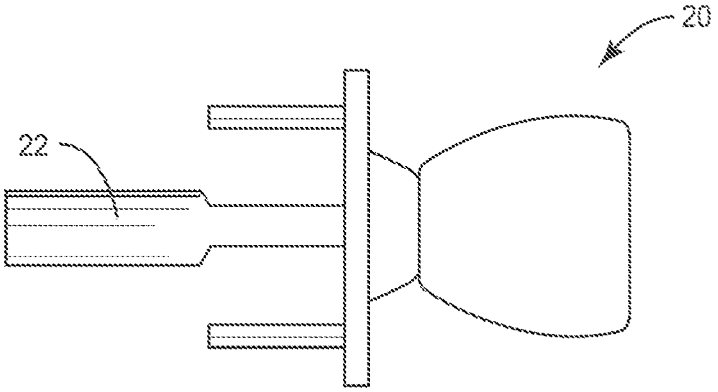
FIG. 2A PRIOR ART
FIGS. 2A and 2B show a first embodiment of a prior art knob traditionally used for operating a cylindrical latch.
Figure 2B:
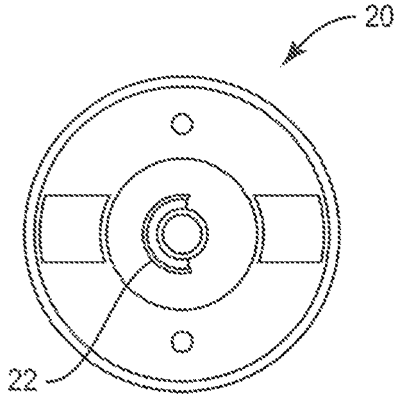
FIG. 2B PRIOR ART
Figure 3A:
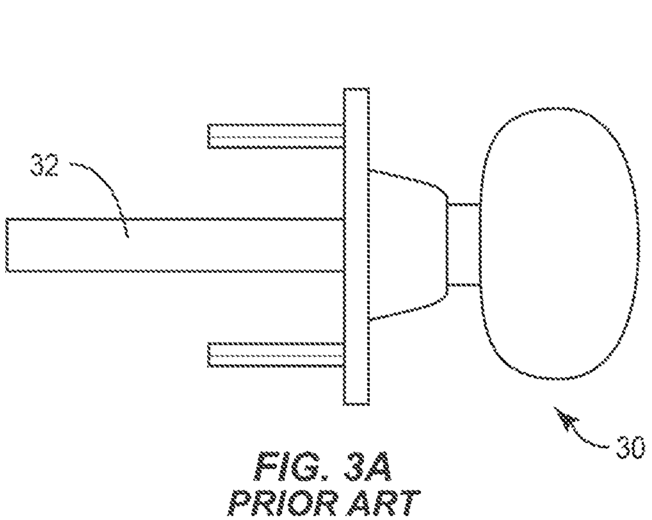
FIG. 3A PRIOR ART
FIGS. 3A and 3B show a second embodiment of a prior art knob traditionally used for operating a cylindrical latch.
Figure 3B:
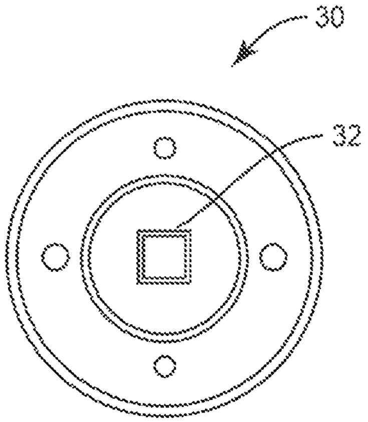
FIG. 3B PRIOR ART

In one embodiment, the present disclosure also seeks to provide a multipoint lock whose construction provides smooth operation of multiple latches with minimal operational forces necessary to operate the multiple latches. Reducing or minimizing operational force requirements facilitates comfortable actuation with knobs 20, 30 (FIGS. 2 and 3) instead of handle levers 12 (FIG. 1), though levers may still be used if desired by the operator.

Figure 7:
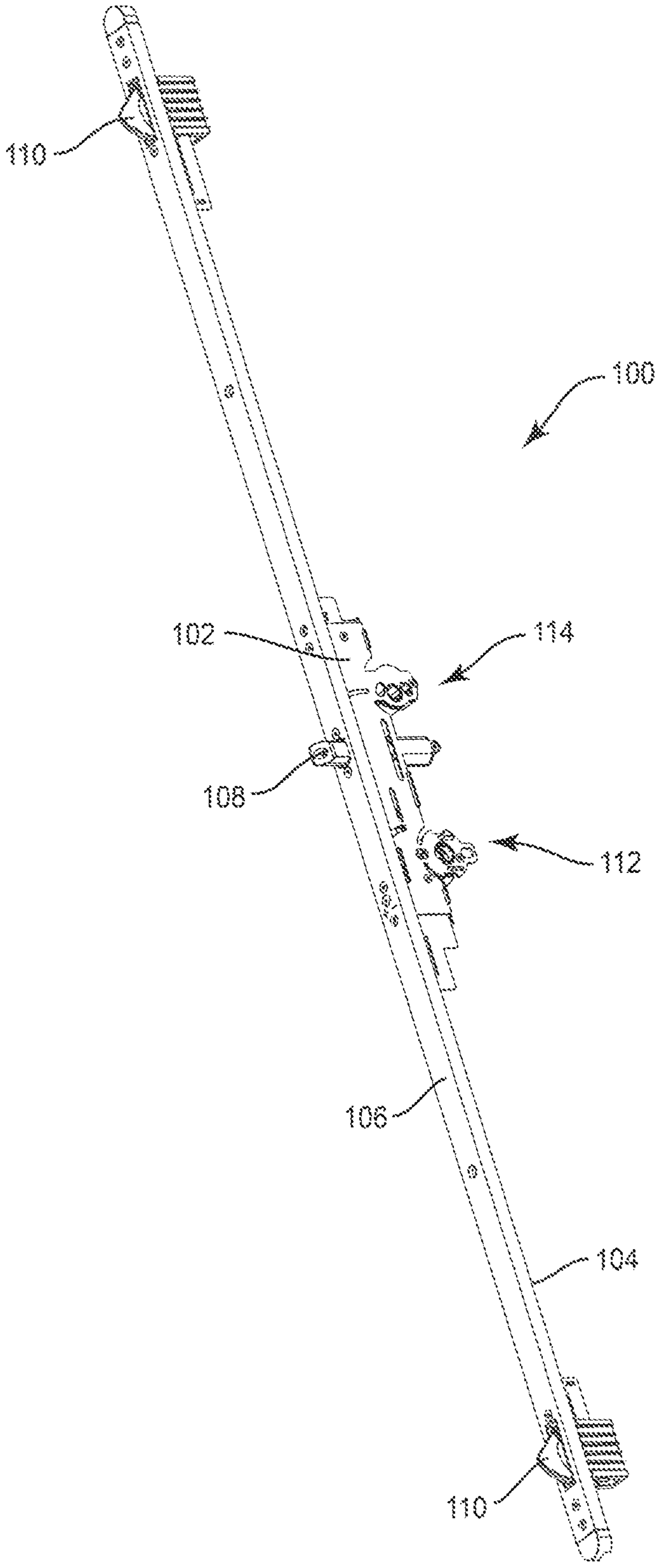
FIG. 7 is a perspective view of a multipoint lock according to an embodiment of the present disclosure.

FIG. 7 shows a multipoint lock 100 according to an embodiment of the present disclosure. As used herein, the term "multipoint lock" means a device for securing a door panel in a closed position relative to a door frame with at least two points of engagement between the door panel and the door frame, wherein the points of engagement are spaced apart by at least about twelve inches. The multipoint lock 100 includes a mortise box 102, a lock channel 104, a face plate 106, a main latch 108, and at least one auxiliary latch 110. As used herein, the term "latch" is used broadly to include any structure configured to extend and retract relative to an edge of a door panel, including components traditionally referred to by one of ordinary skill in the art as latches, latch bolts, and bolts. The mortise box 102 may at least partially house a latch drive hub 112 and a deadbolt drive hub 114. According to an embodiment, the lock channel 104 may be configured and dimensioned to reside within the first slot 72 (FIGS. 6A and 6B). The mortise box 102 may be configured and dimensioned to reside within the second slot 74. Also, the latch drive hub 112 and the deadbolt drive hub 114 are spaced from each other, and offset from the face plate 106, such that the latch drive hub and the deadbolt drive hub may be substantially centered within the through bores 52 and 54 (FIG. 6B) respectively. In one embodiment, the latch drive hub 112 and the deadbolt drive hub 114 are spaced apart by a vertical distance to correspond with the on-center distance M (FIG. 6B) between the through bores 52, 54 of the door panel 50 (FIG. 5, 6B). Similarly, the distance between the face plate 106 and the center of each of the latch drive hub 112 and deadbolt drive hub 114 may be designed to correspond with the setback distance SB (FIG. 6B) of the through bores 52, 54 of the door panel 50. In this embodiment, the multipoint lock 100 can be installed into a pre-bored door panel 50 initially intended for receiving cylindrical lock components after one or more modifications to the door panel are made, as discussed above.

Figures 8A, 8B, 8C:
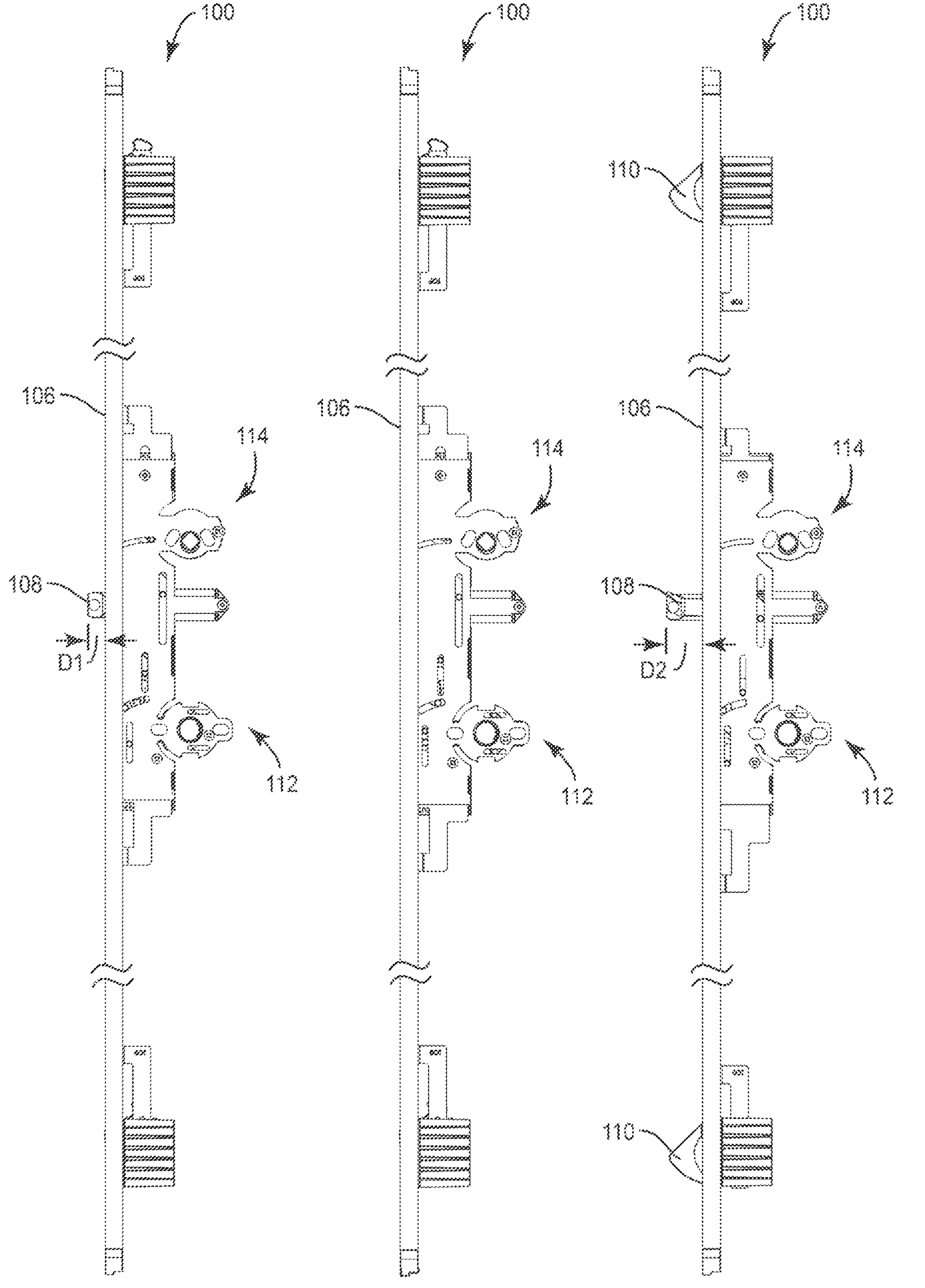
FIGS. 8A, 8B, and 8C are side views of an embodiment of a multipoint lock in a latched position, a retracted position, and a deadbolt position respectively.

FIGS. 8A-8C show the three positions of the multipoint lock 100 according to the present embodiment. FIG. 8A shows a first, latched position in which the main latch 108 extends from the face plate 106 by a first distance DI to engage the door frame 60 (FIG. 5) when the door panel 50 is closed. In one embodiment, the latched position is a home position of the main latch 108. In the illustrated embodiment, each of the auxiliary latches 110 is retracted in the latched position. In other embodiments, the pair of auxiliary latches 110 may extend from the face plate 106 toward the door frame 60, such as, by approximately the first distance of extension of the main latch 108 in the latched position of the multipoint lock 100.

FIG. 8B shows the retracted position of the multipoint lock 100. The retracted position allows the door panel 50 (FIG. 6B) to be opened relative to the door frame 60 (FIG. 5). In the retracted position, the main latch (not shown in FIG. 8B) is substantially recessed relative to the unhinged edge of the door panel. In the retracted position, each of the auxiliary latches will also be withdrawn to be located substantially flush with, and rearward of the face plate 106. Transitioning from the latched position (FIG. 8A) to the retracted position (FIG. 8B) may occur by imposing a rotational force to rotate the latch drive hub 112 as discussed in more detail below. Preferably, from the latched position of the latch drive hub 112, the latch drive hub 112 may be rotated in both a clockwise and counterclockwise direction relative to the same side of the door panel to retract the main latch 108.

FIG. 8C shows a deadbolt position of the multipoint lock 100 used to secure the door panel 50 (FIG. 5) in a closed position relative to the door frame 60. In the deadbolt position, each auxiliary latch 110 extends from the face plate 106 toward, and into engagement with, the door frame 60 (FIG. 5). If the auxiliary latches 110 extend from the face plate 106 in the latched position, not present in the illustrated embodiment, the auxiliary latches may extend by a second distance greater than the first distance from the unhinged edge of the door panel in the deadbolt position. In the deadbolt position, the main latch 108 may continue to extend relative to the face plate 106 by the first distance, as in the latched position of the main latch. In a preferred embodiment, as illustrated, in the deadbolt position, the main latch 108 extends outward from the face plate 106 by a second distance D2 greater than the first distance DI (FIG. 8A). In one embodiment, the deadbolt position of the multipoint lock 100 is achieved by applying a rotational force upon the deadbolt drive hub 114 as discussed further below. In one embodiment, the multipoint lock 100 is transitioned from the latched position (FIG. 8A) to the deadbolt position (FIG. 8C) by rotating the deadbolt drive hub 114 toward the face plate 106, and is returned to the latched position by rotating the deadbolt drive hub in the opposite direction, away from the unhinged edge 56 of the door panel 50 (FIG. 6B).

Figure 9A:
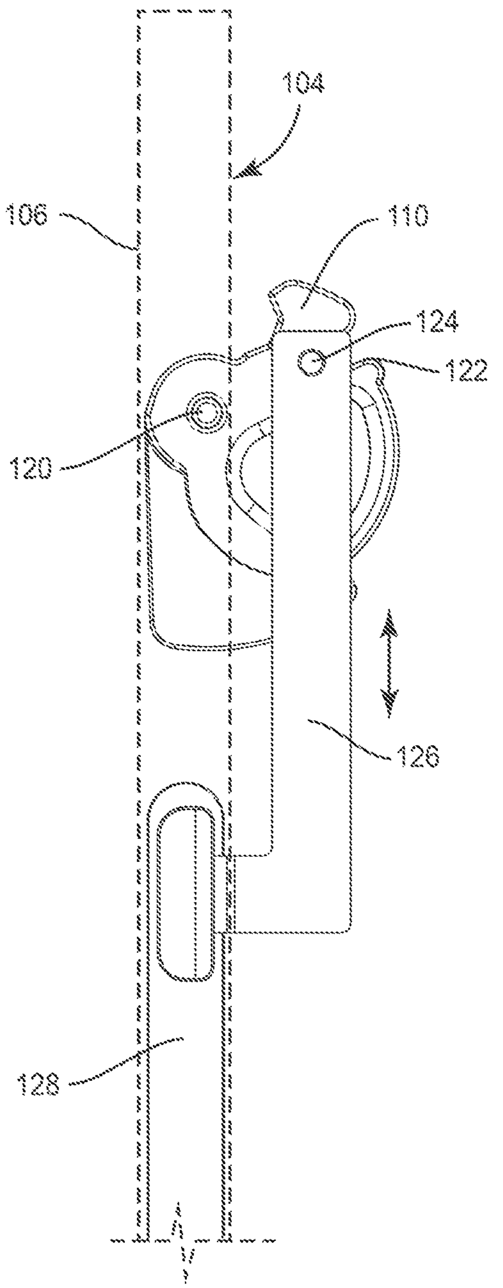
FIGS. 9A and 9B are detailed views of an auxiliary latch according to the embodiment of FIG. 7 in a recessed position and a deadbolt position respectively.
Figure 9B:
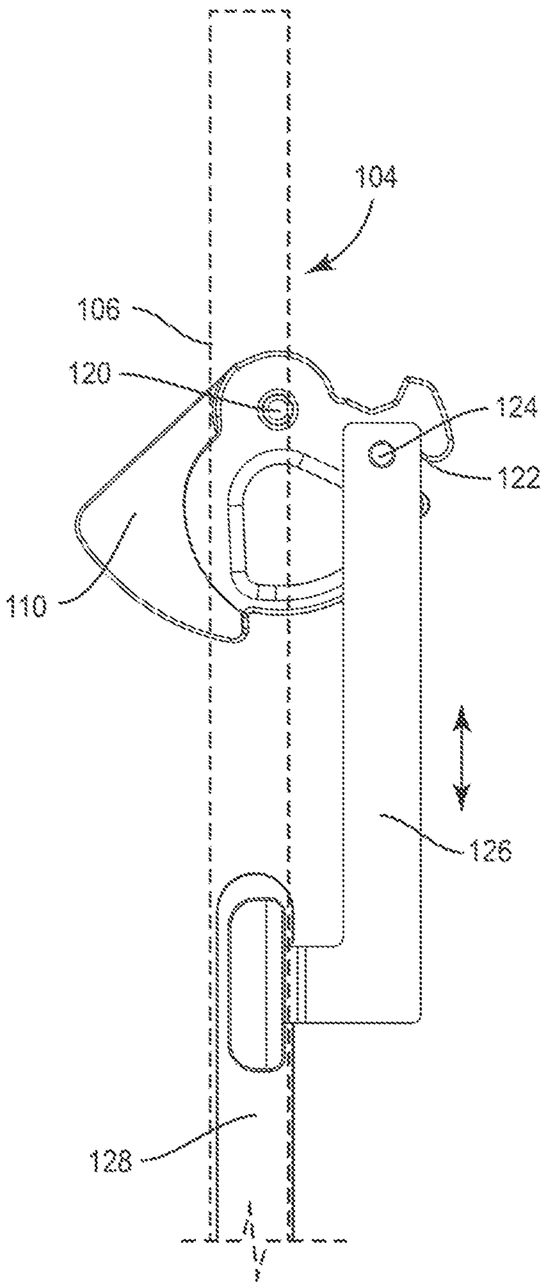

FIGS. 9A and 9B show a detailed view of an auxiliary latch 110 according to one embodiment. An optional housing for the auxiliary latch 110 has been omitted for clarity of illustration. The auxiliary latch 110 in the illustrated embodiment is configured to pivot between a recessed position (FIG. 9A) and a deadbolt position (FIG. 9B) relative to the face plate 106. For example, a pivot pin 120 may be supported by the lock channel 104 and pass through an aperture within the auxiliary latch 110. A slot 122 formed in the auxiliary latch 110 may be configured to receive a roller pin 124. The roller pin 124 may be mounted to an extension link 126 that is fixed relative to a connector rod 128, which may be at least partially received within the lock channel 104. The connector rod 128, and therefore the extension link 126, are configured to be translated vertically during one or more operations of the multipoint lock 100. Relative to FIG. 9A, which shows the auxiliary latch 110 in the recessed position, lowering the extension link 126 will pivot the auxiliary latch toward the extended position thereof as shown in FIG. 9B. In some embodiments, not shown, the auxiliary latch 110 may be configured to hook onto a catch provided as part of the door frame 60 (FIG. 5). In other embodiments, the auxiliary latch 110 may be configured to travel linearly between the recessed position and one or more extended positions. In other embodiments, the auxiliary latch 110 may additionally or alternatively comprise shoot bolts configured to extend vertically relative to a door panel.

Figure 10C:
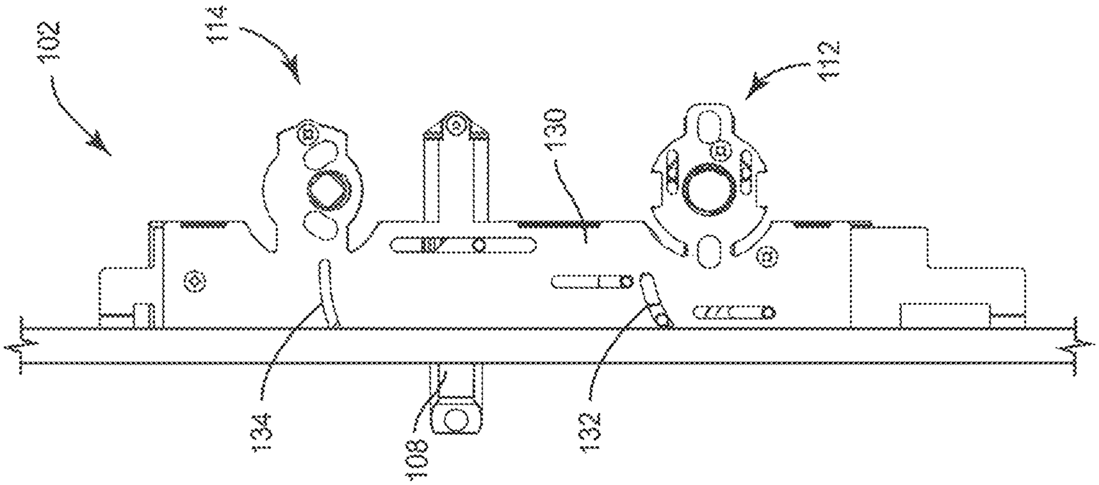
FIGS. 10A-C are detailed views of a mortise box of the multipoint lock of FIG. 7 in a latched position, a retracted position, and a deadbolt position respectively.
Figure 10B:
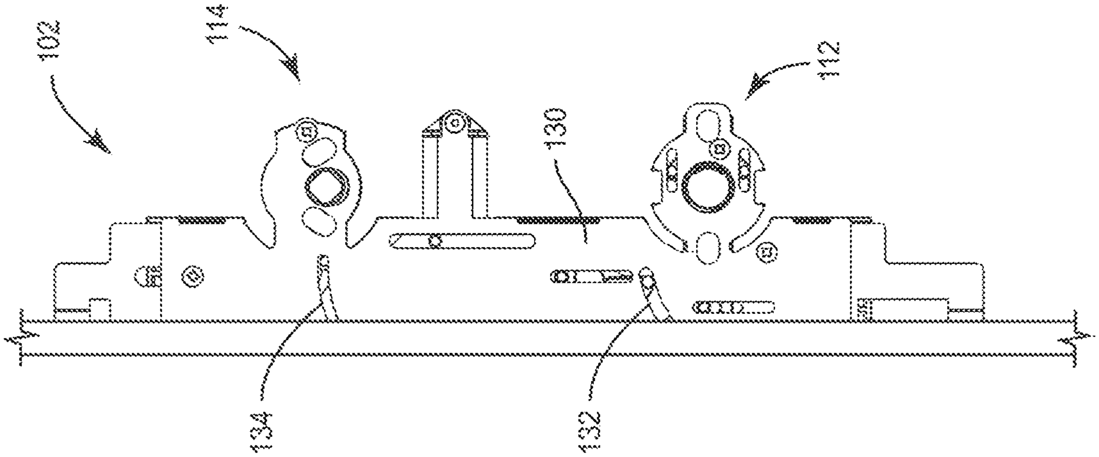
Figure 10A:
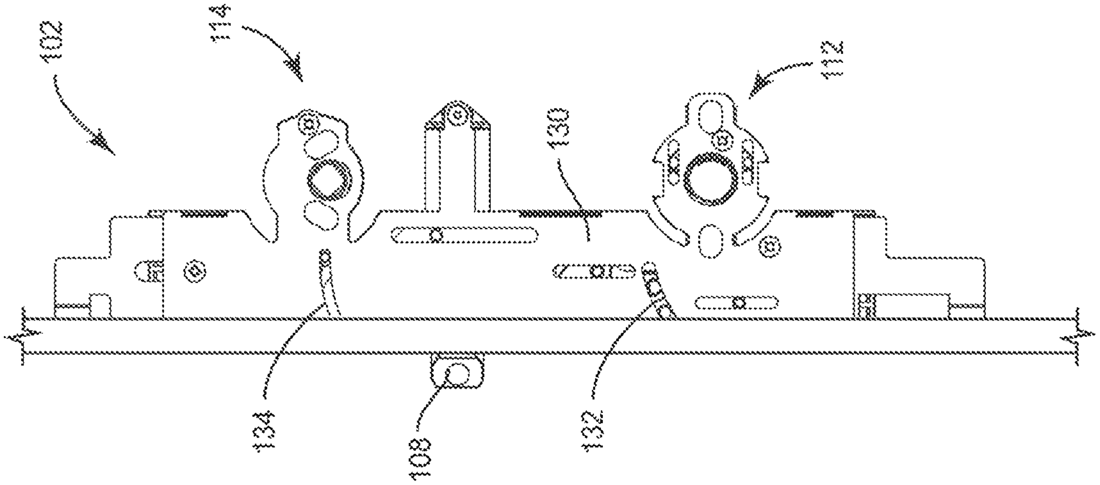

FIGS. 10A-C show a detailed view of the mortise box 102 in the latched, retracted, and deadbolt positions respectively. As discussed above, the mortise box 102 may be constructed to locate the latch drive hub 112 and the deadbolt drive hub 114 for substantially centered placement within the pre-bored through bores 52, 54 of a door panel 50 (FIG. 5). The mortise box 102 may include a cover 130. The cover 130 may be formed with a latch guide slot 132 configured to guide travel of components when the latch drive hub 112 is rotated. The cover 130 may also include a deadbolt guide slot 134 configured to guide travel of components when the deadbolt drive hub 114 is rotated. Each of the latch guide slot 132 and the deadbolt guide slot 134 may be arcuate in shape.

Figure 11C:
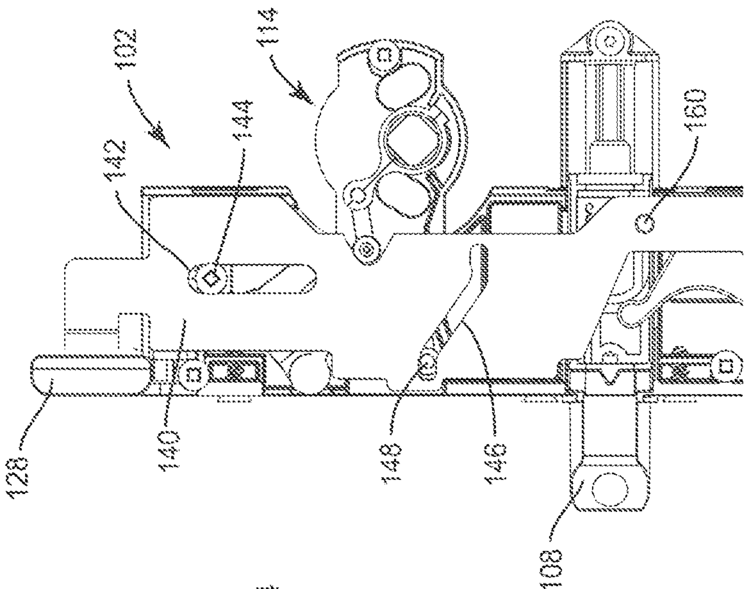
FIGS. 11A-C are detailed views of a top portion of the mortise box of FIGS. 10A-C showing the latched position, the retracted position, and the deadbolt position respectively, with the mortise box cover omitted.
Figure 11B:
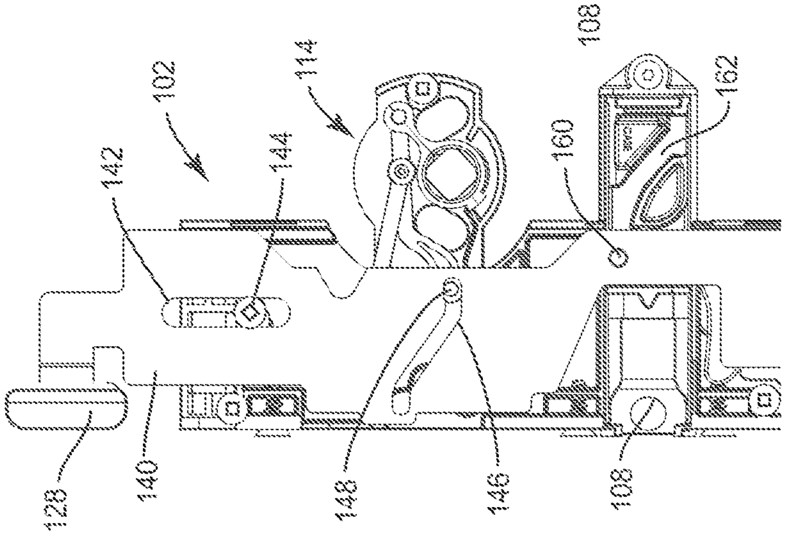
Figure 11A:
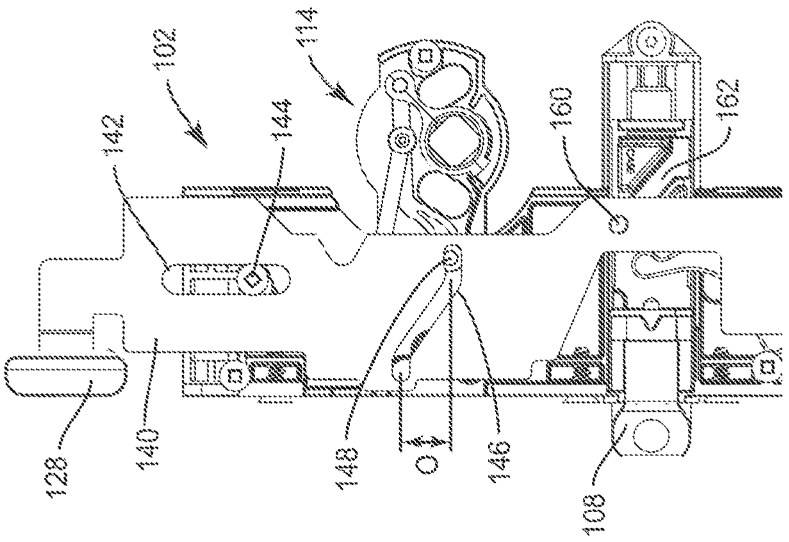

FIGS. 11A-C show detailed views of the upper portion of the mortise box 102, including the deadbolt drive hub 114, with the cover 130 of the mortise box and the lock channel 104 omitted. FIG. 11A shows the latched position, FIG. 11B shows the retracted position, and FIG. 11C shows the deadbolt position. A drive plate 140 may be located at least partially within the mortise box 102. The drive plate 140 is translationally fixed relative to the connector rod 128, which extends toward the auxiliary latch 110 (FIG. 7). The drive plate 140 and the connector rod 128 may be a single integral component or multiple pieces attached together. The drive plate 140 may have a drive plate guide slot 142, which receives a drive plate guide boss 144. The drive plate guide slot 142 may be positioned vertically to guide the vertical movement of the drive plate 140. The drive plate guide boss 144 may be provided as part of the mortise box 102. In the illustrated embodiment, the drive plate 140 is in a raised position relative to the mortise box 102 in the latched and retracted positions (FIGS. 11A and 11B), and in a lowered position relative to the mortise box in the deadbolt position (FIG. 11C). In the illustrated embodiment, the drive plate 140 is translated as a result of sliding interaction between an actuation slot 146 formed in the drive plate 140, and an actuation pin 148. The actuation slot 146 may be described as being shaped like an escalator, with a sloped midsection and offset horizontal ends. The offset distance O (FIG. 11A) dictates the magnitude of vertical travel of the drive plate 140. The angle of the sloped midsection relative to horizontal may impact the force required to return the multipoint lock 100 from the deadbolt position to the latched position. Because the deadbolt position of the illustrated embodiment locates the drive plate 140 in a lowered position, gravity is able to assist, i.e. reduce the required input force, to transition the multipoint lock 100 from the latched position to the deadbolt position.

Figure 12A:
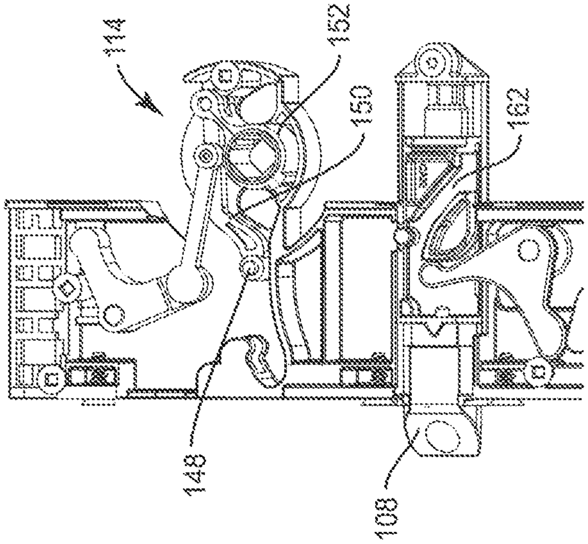
FIGS. 12A-C are detailed views of the top portion of the mortise box of FIGS. 11A-C showing the latched position, the retracted position, and the deadbolt position respectively, with the drive plate also omitted.
Figure 12B:
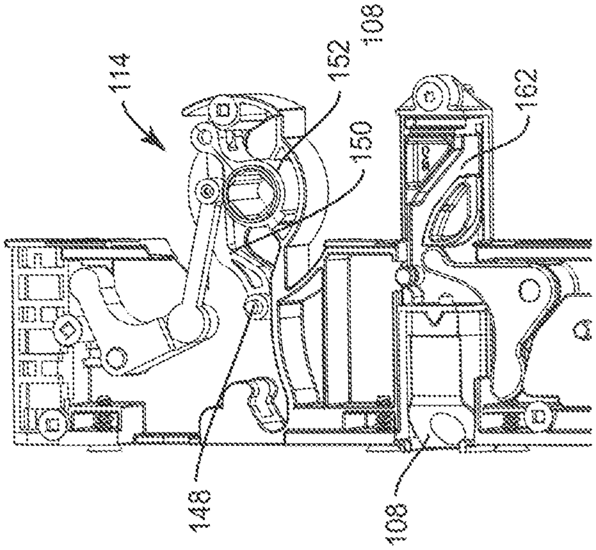
Figure 12C:
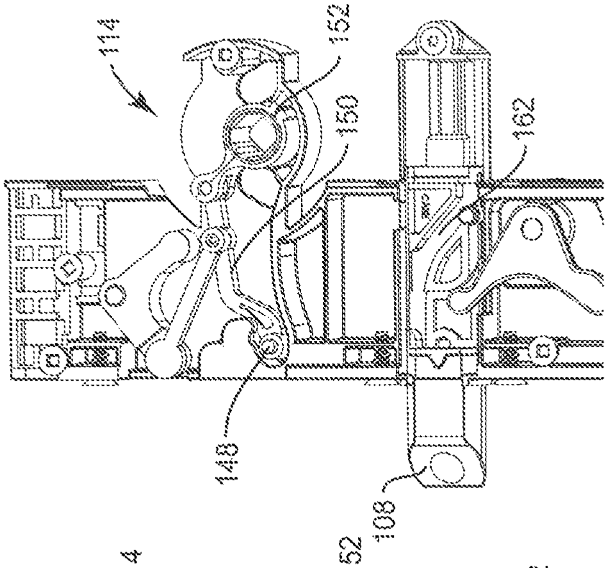

To translate the drive plate 140, the actuation pin 148 is shifted along the actuation slot 146. Compare, for example, FIGS. 11B and 11C. As shown in FIGS. 12A-C, where the drive plate has been omitted, the actuation pin 148 may be provided at an outer end of a link arm 150. An inner end of the link arm 150 may be pivotably joined with a deadbolt lever 152 of the deadbolt drive hub 114. As will be understood by one of ordinary skill in the art, to transition from the latched position (FIG. 12A) to the deadbolt position (FIG. 12C), and vice versa, an operator can cause rotation of the deadbolt lever 152 with external hardware such as a key cylinder or thumb-turn. As the deadbolt lever 152 is rotated, the actuation pin 148 follows the constrained path defined by the deadbolt guide slot 134 (FIGS. 10A-C) in the cover 130. As the actuation pin 148 travels along the deadbolt guide slot 134, the shape of the actuation slot 146 (FIGS. 11A-C) and its interaction with the actuation pin 148 raises or lowers the drive plate 140.

Returning to FIGS. 11A-C, vertically translating the drive plate 140 from the raised position to the lowered position also causes the main latch 108 to extend from the first extended position of the latched position to the second extended position of the deadbolt position in the illustrated embodiment. The drive plate 140 carries a deadbolt pin 160, which travels within and bears against a camway 162 attached to or formed with the main latch 108. As the deadbolt pin 160 travels downward with the drive plate 140, the shape of the camway 162 forces the main latch 108 to the deadbolt position.

Figure 13C:
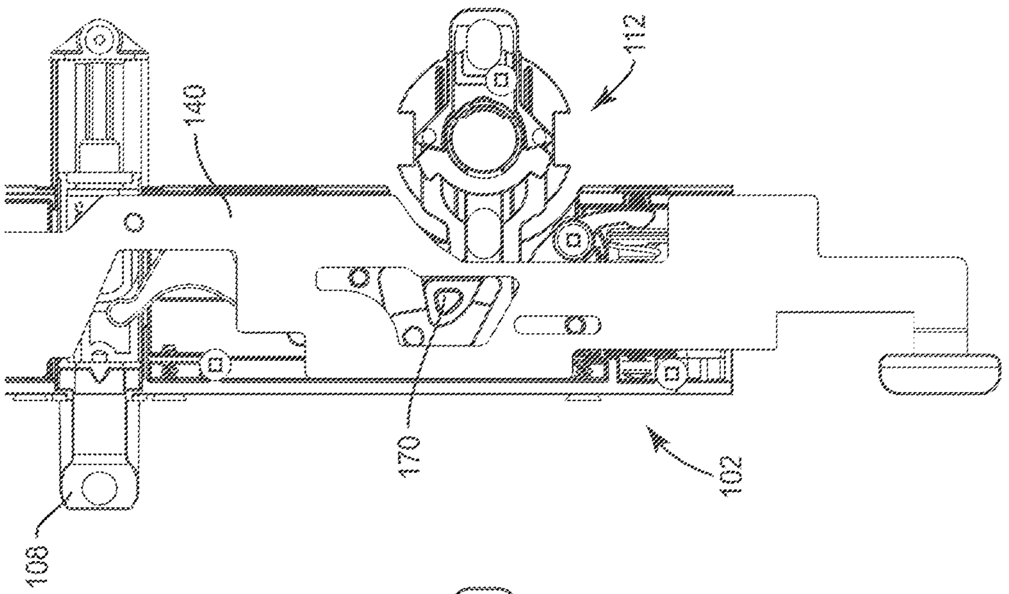
FIGS. 13A-C are detailed views of a bottom portion of the mortise box of FIGS. 10A-C showing the latched position, the retracted position, and the deadbolt position respectively, with the cover omitted.
Figure 13B:
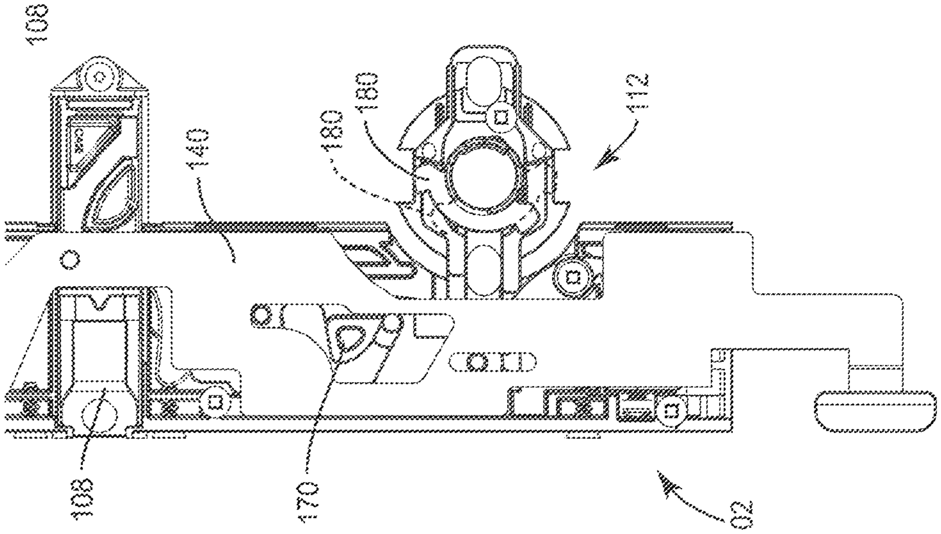
Figure 13A:
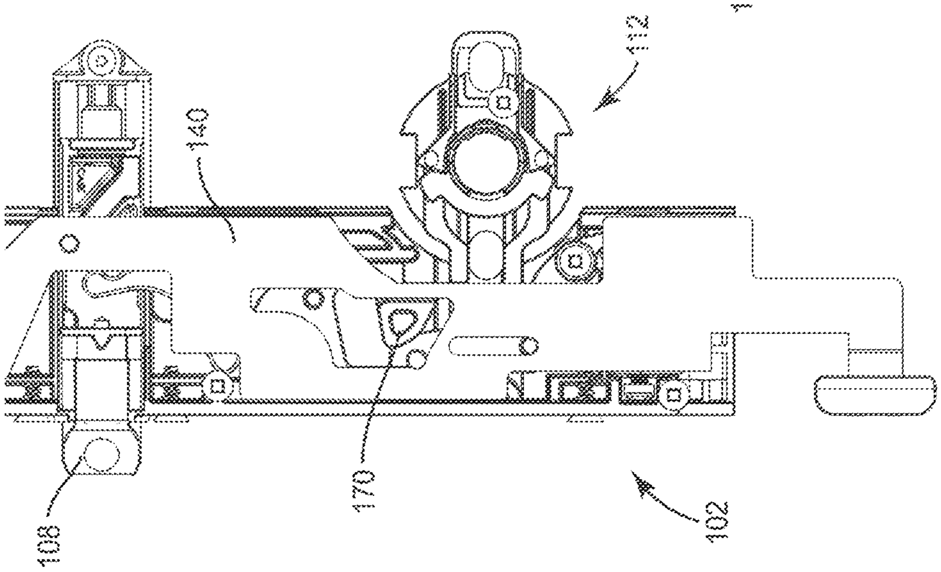

FIGS. 13A-C show a detailed view of the lower portion of the mortise box 102, including the latch drive hub 112, with the cover 130 (FIG. 10A) of the mortise box omitted. Again, FIG. 13A shows the latched position, FIG. 13B shows the retracted position, and FIG. 13C shows the deadbolt position. As possibly best seen in FIGS. 14A-C, a slide 170 is shifted upward in the latched position and downward in the deadbolt position. The slide 170 translates with motion of the drive plate 140 (FIGS. 13A-C). An abutment surface at the top of the slide 170 may contact a first end 172 of a bell crank 174. The bell crank 174 may be pivotably mounted in the case 176 of the mortise box 102. Therefore, translation of the slide 170 can cause rotation of the bell crank 174. A second end 178 of the bell crank 174 may contact an abutment surface formed with the main latch 108. Therefore, the bell crank 174 may assist with sliding the main latch 108 from a respective latched positon to a retracted position as the bell crank rotates with the upward motion of the slide 170.

Figures 14A, 14B, 14C:
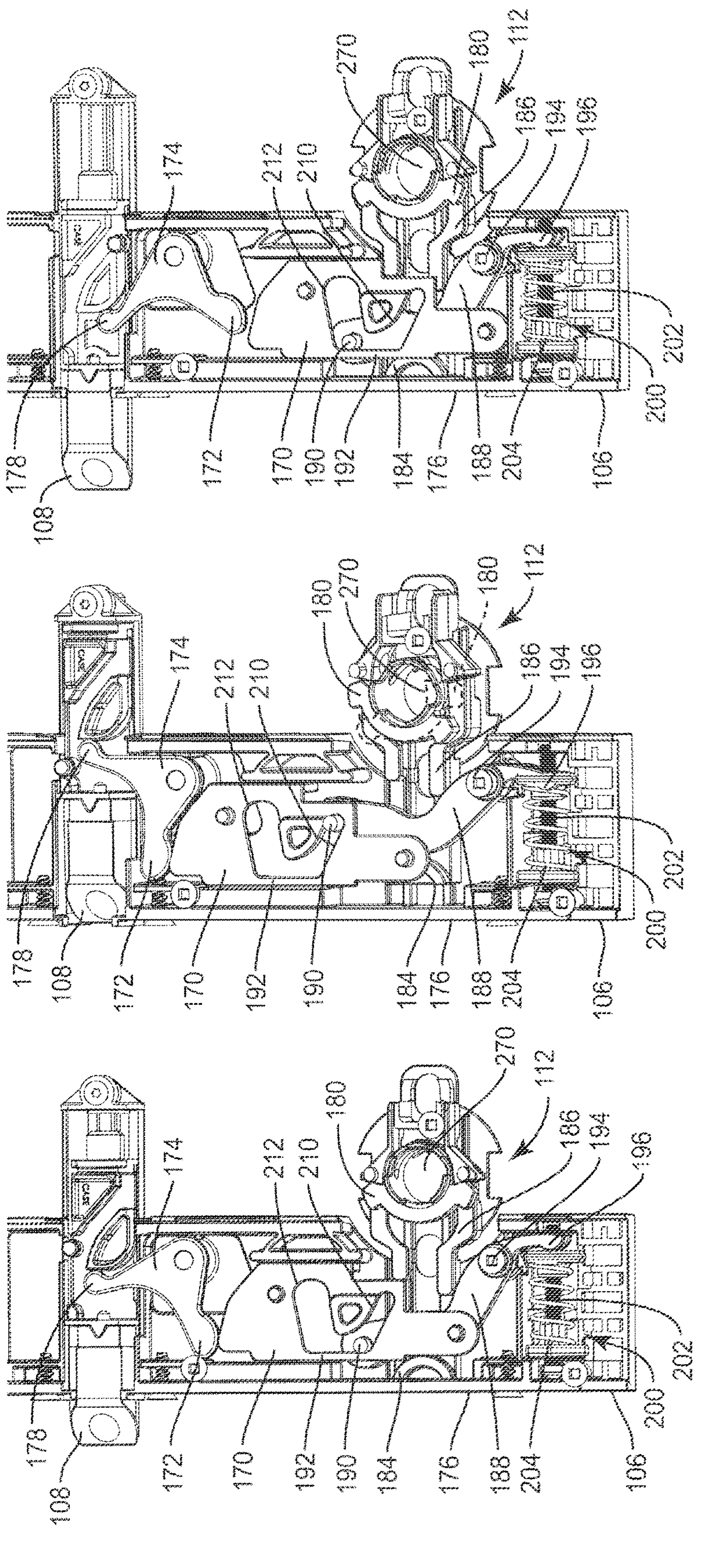
FIGS. 14A-C are detailed views of the bottom portion of the mortise box of FIGS. 13A-C showing the latched position, the retracted position, and the deadbolt position respectively, with the drive plate also omitted.

FIGS. 13B and 14B show a detailed view of the lower portion of the mortise box 102, each with the cover 130 removed. FIG. 14B further omits the drive plate 140. The main latch 108 is shown in a retracted position. According to the present embodiment, the main latch 108 translates from the latched position to the retracted position when a rotational input force is provided by an operator at the latch drive hub 112, particularly a handle hub 180. According to a preferred embodiment, a rotational input in both a clockwise and a counterclockwise direction relative to the same side of a door panel, from an initial position of the handle hub 180, may cause the main latch 108 to retract from the latched position. FIGS. 13B and 14B show the handle hub 180 in dashed lines to represent the position of the handle hub if the latch drive hub 112 were rotated counterclockwise in the illustrated views. In one embodiment, the other components effected by rotation of the handle hub 180 arrive at the same position independent of the direction of rotation of the handle hub. In some embodiments, rotating the handle hub 180 will not retract the main latch 108 if the multipoint lock 100 is in the deadbolt position (see FIG. 14C). In some embodiments, the multipoint lock 100 may be provided with a “panic” feature. If provided, a “panic” feature retracts the main latch 108 and the auxiliary latch 110 (FIG. 7) with rotation of the handle hub 180 using an interior handle or knob, even if the multipoint lock 100 is in the deadbolt position. If the “panic” feature is provided, the deadbolt position of the multipoint lock 100 either prevents rotation of an exterior handle, or rotation of an exterior handle when the multipoint lock is in the deadbolt position will not retract any of the latches 108, 110.

Figure 1:
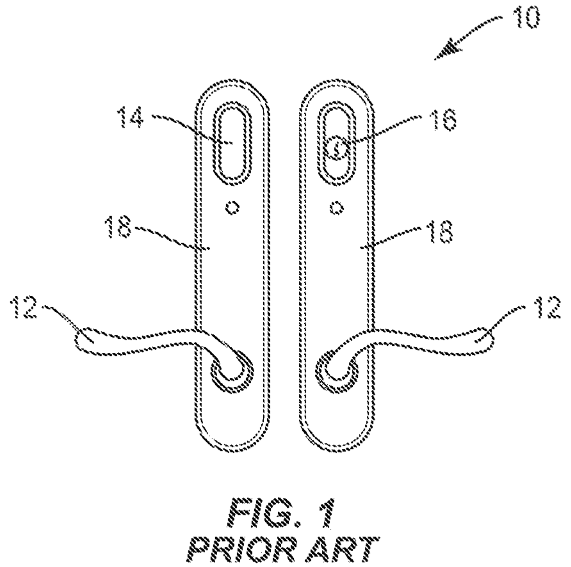
FIG. 1 PRIOR ART
FIG. 1 shows prior art multipoint hardware for a multipoint lock.

Again, the multipoint lock 100 may achieve the retracted position of FIG. 14B from the latched position of FIG. 14A by rotating the handle hub 180 from an initial position, i.e. the latched position, to a rotated position using hardware as shown in FIG. 1, for example. The periphery of the handle hub 180 is provided with a cam shape such that rotation of the handle hub 180 can have the effect of pulling a distal end 184 of a transfer bar 186 away from the face plate 106. The transfer bar 186 acts upon a latch drive link 188. A latch drive pin 190 at one end of the latch drive link 188 travels within an aperture 192 of the slide 170. Interaction between the latch drive pin 190 and the aperture 192 causes the slide 170 to rise farther from the latched position thereof. Further lifting of the slide 170 further rotates the bell crank 174, whose second end 178 presses the main latch 108 toward the retracted position (FIG. 14B).

Staying with FIGS. 14A-C, the latch drive link 188 may be pivotably mounted to the case 176 about a pivot point 194 located along the length of the latch drive link. An opposite end 196 of the latch drive link 188 may provide an abutment surface for a latch return assembly 200. The latch return assembly 200 may include an adjustment screw 202 that is accessible through the face plate 106. Rotating the adjustment screw 202 is configured to adjust the tension on a spring 204, thereby adjusting the amount of biasing force applied to the opposite end 196 of the latch drive link 188 for returning the latch drive link and the main latch 108 from the retracted position to the latched position. The spring 204 may also contribute to rotation of the handle hub 180, and the hardware attached thereto, back to a home position after being released by the operator.

As shown in FIGS. 14A-C, the aperture 192 within the slide 170 can be configured as a C-shape. The latch drive pin 190 travels along the substantially vertical portion of the C-shape as the slide 170 adjusts vertically while the multipoint lock 100 transitions between the deadbolt position (FIG. 14C) and the latched position (FIG. 14A). The latch drive pin 190 is aligned with, travels along, and provides an abutment force to a lower branch 210 of the C-shaped aperture 192 to transition the multipoint lock 100 (FIG. 7) from the latched position to the retracted position. The latch drive pin 190 is aligned with and enters an upper branch 212 of the C-shaped aperture 192 when the deadbolt drive hub 114 is in the deadbolt position and the handle hub 180 is rotated. The upper branch 212 is sized and shaped such that the latch drive pin 190 freely travels within the upper branch and does not provide significant forces to the edges thereof. Therefore, rotating the handle hub 180 while the multipoint lock 100 is in the deadbolt position will cause movement of the latch drive pin 190, but the motion of the latch drive pin will not be transmitted to motion of the slide 170.

In one embodiment, the multipoint lock 100 (FIG. 7) according to the embodiments discussed above facilitates being operated by hardware typically reserved for operating a cylindrical lock, thereby increasing the choices and availability of hardware available for use with multipoint locks. In one example, the multipoint lock 100 mirrors the functionality traditionally associated with knob-operated cylindrical latches in that the main latch 108 will retract from the latched position with rotation of the handle hub 180 in either direction from an initial position thereof.

Figure 4:
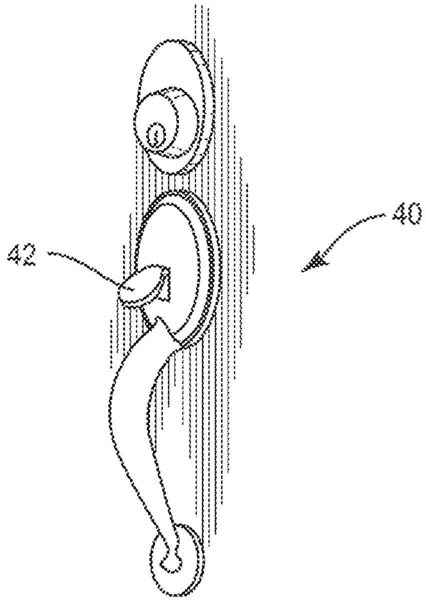
FIG. 4 PRIOR ART
FIG. 4 shows prior art thumb-actuated hardware used for operating a cylindrical latch.
Figure 15B:
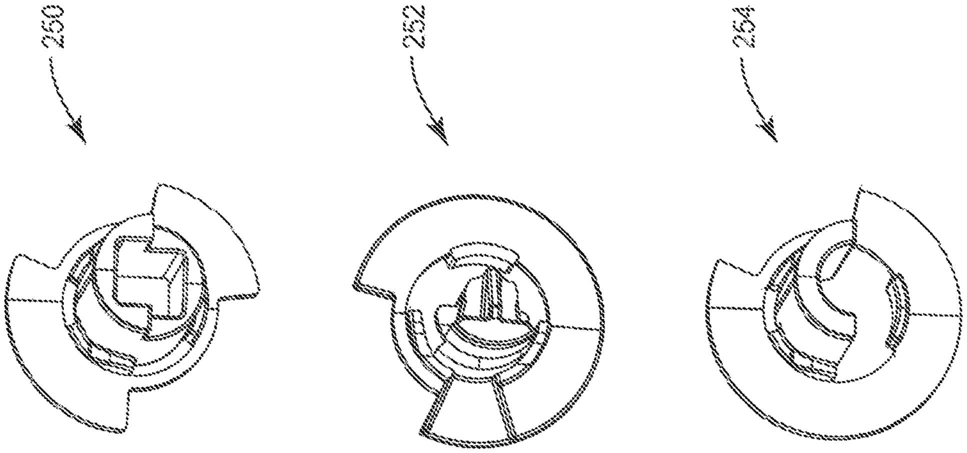
FIGS. 15A and 15B are front and rear views of adaptors suitable for reconfiguring the multipoint lock of FIG. 7.
Figure 15A:
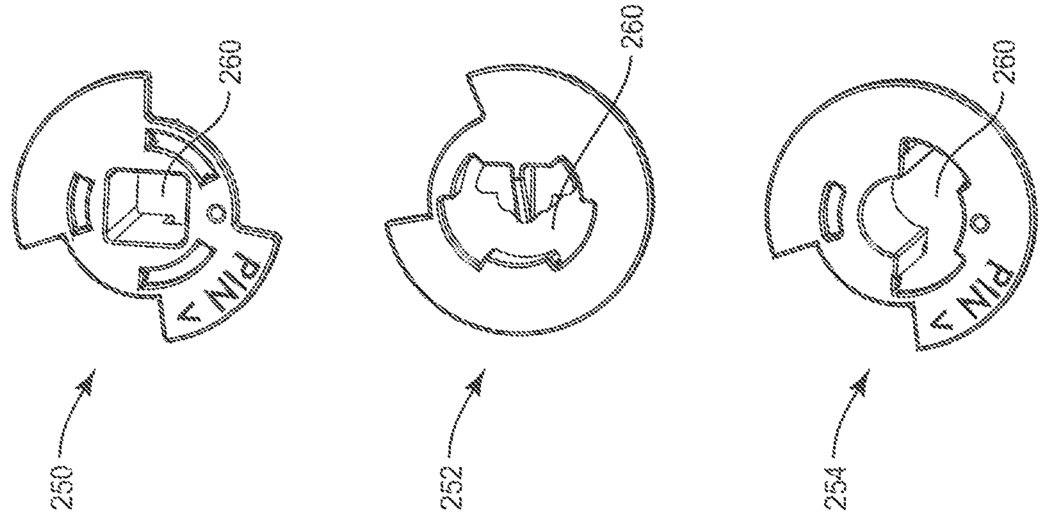

In another example of a feature that facilitates use with cylindrical lock hardware, the handle hub 180 (FIG. 13A) is designed to be reconfigurable such that the handle hub may be operated, i.e. rotated, with any of a handle lever 12 (FIG. 1), a knob 20, 30 (FIGS. 2 and 3) or a thumb latch 42 (FIG. 4). As such, the handle hub 180 is suitable for actuation by hardware traditionally designed to engage with cylindrical latches. In one embodiment, the handle hub 180 is configurable to universally accept entry door hardware regardless of the configuration or original manufacturer through the selective use of one or more hub adaptors 250, 252, 254 as shown in FIGS. 15A and 15B. One of ordinary skill in the art can appreciate that the handle hub 180 without an adaptor 250, 252, 254 in-use can constitute a first configuration suitable for use with some entry door hardware. The adaptors 250, 252, 254 each have a bore 260 of a different geometry to reconfigure the shape of a passage 270 (FIG. 14A) through the handle hub 180. The passage 270 is used to receive the spindle from a respective hardware set given that hardware of the various types described above have spindles of various sizes and shapes. In one embodiment, the adaptors 250, 252, 254 may attach to the handle hub 180, or another adaptor, with a friction fit. In other embodiments (not shown), the adaptors 250, 252, 254 may be formed with integral spring legs to snap or clip into engagement with the handle hub 180. Alternatively, the handle hub 180 may be configured with resilient portions to selectively retain the adaptors 250, 252, 254.

The adaptors 250, 252, 254 may be created and provided on a molding sprue. If provided on a molding sprue, one of ordinary skill in the art will appreciate that the adaptors 250, 252, 254 would be detached from the molding sprue prior to use. A plurality of deadbolt adaptors (not shown) may also be provided to interface with the deadbolt drive hub 114 (FIG. 7) in much the same way as the adaptors 250, 252, 254 selectively interface with the handle hub 180. Thus, the deadbolt drive hub 114 can also be reconfigurable to mate with hardware, such as a thumb turn 14 (FIG. 1), whose spindle may vary depending upon the manufacturer thereof.

Figures 16A, 16B:
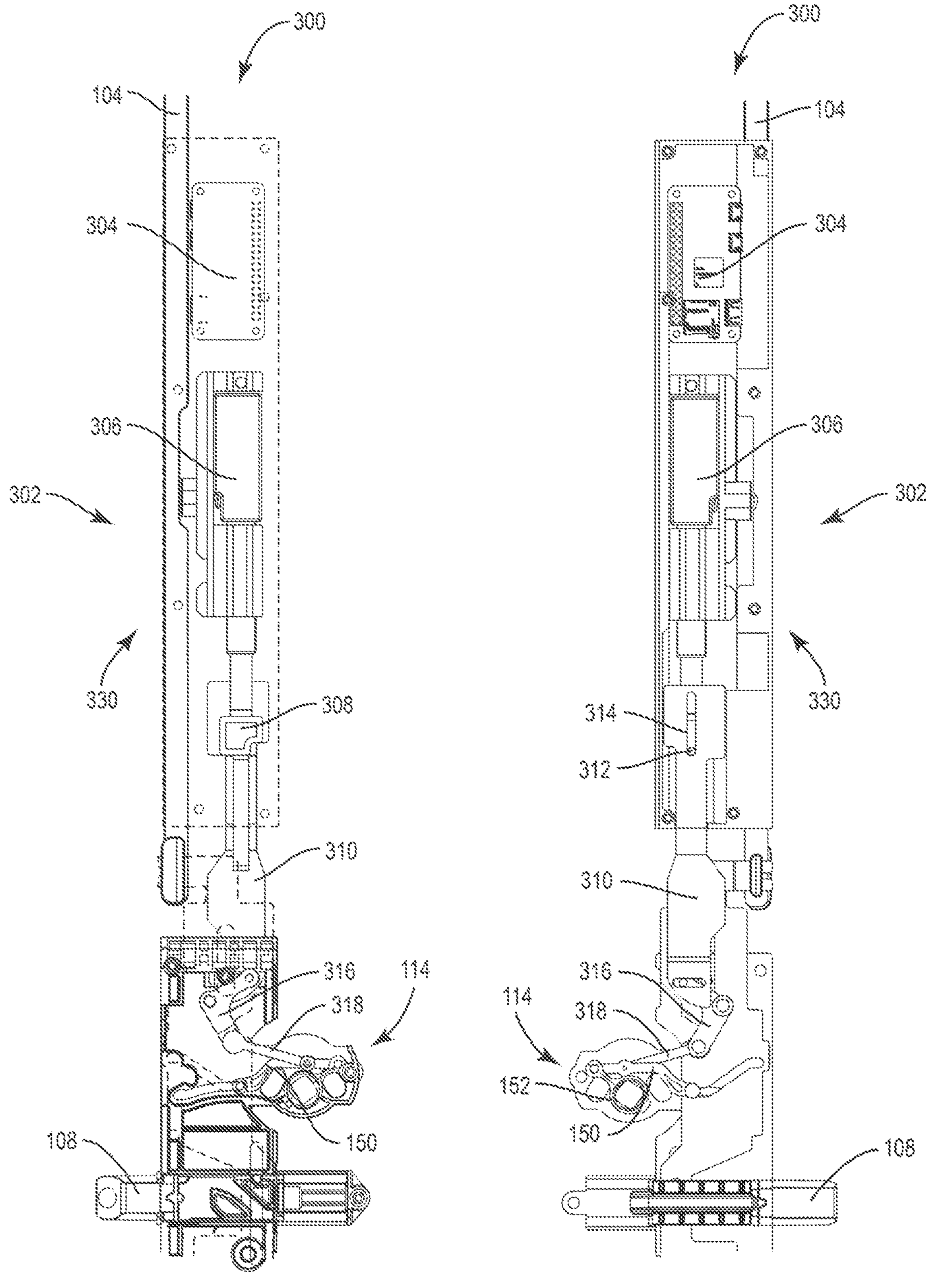
FIGS. 16A and 16B are front and back detailed views of a powered multipoint lock according to another embodiment of the present disclosure.

FIGS. 16A and 16B show a front and back detailed view of a deadbolt position similar to FIG. 12C, of a multipoint lock 300 according to another embodiment. The multipoint lock 300 is substantially similar to the multipoint lock 100 (FIG. 7) described above and shown throughout the figures, but an additional powered actuator assembly 302 has been added. The illustrated powered actuator assembly 302 is configured to contribute the input force necessary to transition the multipoint lock 300 between the latched position and the deadbolt position without manually rotating the deadbolt drive hub 114. In some embodiments, a powered actuator assembly 302 may also be capable of actions that result in the multipoint lock 300 being transitioned to the retracted position.

The powered actuator assembly 302 may include a controller 304. The controller 304 may include an integrated circuit and be configured to convert commands to actions. The controller 304 may be configured to receive and transmit a wireless signal. The controller 304 may be triggered by buttons accessible on the door panel or through a wireless signal from devices including, but not limited to, wireless gateways, fobs, and smart phones.

The powered actuator assembly 302 may include an actuator 306, such as a linear actuator with a motor. The controller 304 may be operatively coupled to the actuator 306 to expand and contract the actuator, thereby translating a drive slide 308. The drive slide 308 may selectively translate an actuator drive plate 310, provided in addition to the drive plate 140 (FIG. 11C) discussed above. The drive slide 308 may include a drive pin 312 capable of sliding within a drive slot 314 of the actuator drive plate 310. The drive pin 312 can actuate the actuator drive plate 310 when the drive pin applies a force to an end of the drive slot 314.

The actuator drive plate 310 may engage one side of a pivot lever 316. The pivot lever 316 may be capable of pivoting relative to the mortise box 102 (FIG. 7). The opposite side of the pivot lever 316 may be pivotably connected to a coordinator link 318. The coordinator link 318 may be pivotably attached to the link arm 150 described above.

To return to the latched position from the illustrated deadbolt position using the powered actuator assembly 302, the actuator 306 can contract or rotate to lift the drive slide 308 and pull upwardly upon the actuator drive plate 310. Upward motion of the actuator drive plate 310 pivots the pivot lever 316 counterclockwise as illustrated in FIG. 16B, forcing the coordinator link 318 and link arm 150 to rotate the deadbolt lever 152 in a clockwise direction relative to FIG. 16B. Rotation of the deadbolt lever 152 may concurrently cause motion of the drive plate 140 (FIG. 12C) and the latches 108, 110 (FIG. 7) as discussed above.

In one embodiment, the controller 304 is configured to operate the actuator 306 in such a manner that the drive slide 308 has at least three positions: a raised position, a lowered position, and a middle position. Motion of the drive slide 308 toward the raised position above the middle position would move the illustrated multipoint lock 300 from the deadbolt position toward the latched position. Motion of the drive slide 308 toward the lowered position from below the middle position would move the illustrated multipoint lock 300 from the latched position toward the deadbolt position. Then, in one embodiment, each time the drive slide 308 is driven to the raised or lowered position, the controller 304 may operate the actuator 306 to return the drive slide back to the middle position. With the drive slide 308 staged in the middle position as shown in FIG. 16B, the relative positions of the drive pin 312 and drive slot 314 will allow the actuator drive plate 310 to slide in response to manual rotation of the deadbolt lever 152.

Figure 17:
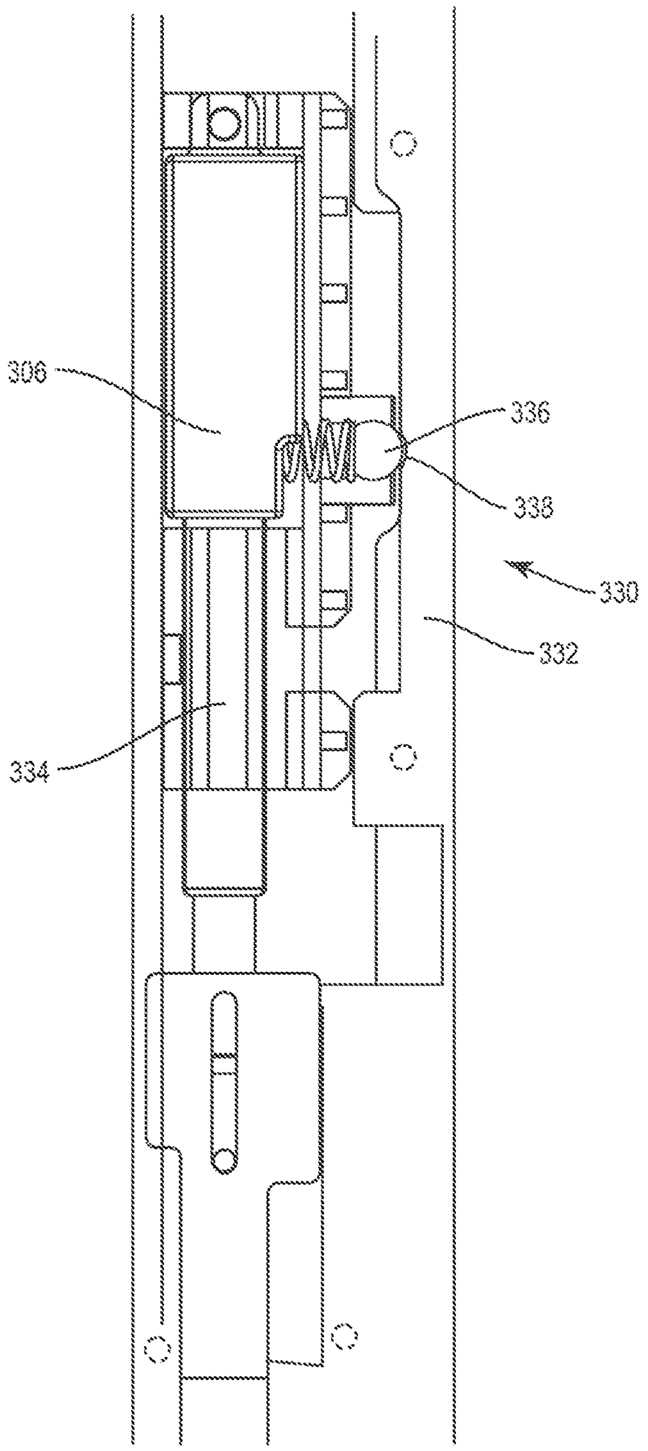
FIG. 17 is a detailed view of a fail-safe feature incorporated into a multipoint lock that is outfitted with a powered actuator.

In some embodiments, the multipoint lock 300 with a powered actuator 306 may include a fail-safe feature 330 as shown in additional detail in FIG. 17. The fail-safe feature 330 is configured to allow the multipoint lock 300 to be manually adjusted from the deadbolt position to the latched and retracted positions even if the actuator 306 fails in a position that would otherwise imped the necessary motion of the actuator drive plate 310 to unlock the device. The fail-safe feature 330 may include a housing 332 fixed to the lock channel 104 (FIG. 16A) and a support 334. The support 334 is capable of sliding relative to the housing 332. The support 334 is fixed to the actuator 306. The support 334 can be typically held in place within the housing 332 by engaging a spring biased ball 336 with a detent 338 formed in the housing. If sufficient force is applied to the drive slide 308, the ball 336 is configured to disengage from the detent 338 and allow the actuator 306 to be dislodged relative to the housing 332, and therefore translated relative to the lock channel 104. The illustrated example shows a spring biased ball and detent configuration but other compliant structures may be used that are configured to retain two components fixed to one another up to a threshold force, and configured to give way when subject to forces above the threshold force.

Figure 18:
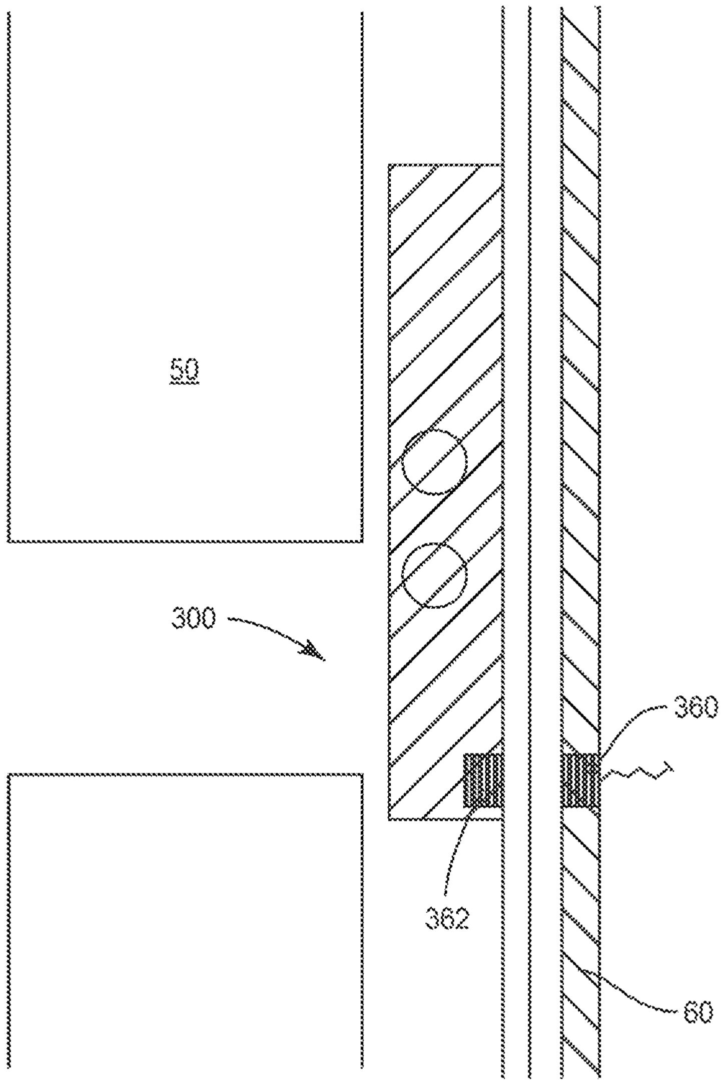
FIG. 18 is a schematic of a system for charging a multipoint lock according to an embodiment of the present disclosure.

The optional powered actuator assembly 302 can include a power source (not shown), such as a rechargeable battery pack. Preferably the power source is replenished without accessing the power source, e.g. without replacing the batteries. FIG. 18 schematically illustrates an embodiment where the power source is re-energized using an inductive charging system. A primary coil 360 may be installed on or adjacent to the door frame 60. The primary coil 360 could be hard wired to the main power supply of a house, such as the electrical grid. A secondary coil 362 may be incorporated into the mortise box 102 (FIG. 7), or otherwise provided as part of the multipoint lock 300, and operably coupled to the power source. When the door panel 50 is closed, the primary coil 360 should be within sufficient proximity to the secondary coil 362 to transfer energy via an electromagnetic field from the primary coil to the secondary coil, allowing the power source to be re-energized.

In another, potentially less preferred embodiment (not shown), the power source may be charged, or provided, by being hard wired to the building's main source of electricity. For example, electrical energy could pass from the building to the door panel 50 through the hinges of the door panel, and travel by wire from the hinge to the power source. In a further embodiment, a solar cell could be mounted to an exterior face of the door panel 50 to collect energy from the sun to be stored within the batteries of the power source.

Embodiments of the present disclosure presented above may be reflected in the following paragraphs:

Paragraph 1: A multipoint lock, comprising:
- a main latch;
- at least one auxiliary latch;
- a latch drive hub; and
- a deadbolt drive hub,
- wherein the latch drive hub is configurable to be rotated by at least two of: a first knob configuration, a second knob configuration, a handle lever, and a thumb latch, to retract the main latch,
- wherein the deadbolt drive hub is configurable to be rotated by each of a key and a thumb turn to extend the at least one auxiliary latch.

Paragraph 2: The multipoint lock of paragraph 1, wherein rotation of the deadbolt drive hub in a first direction extends the main latch from a latched position to a deadbolt position.

Paragraph 3: The multipoint lock of paragraph 1, wherein one or more adaptors are attached to a handle hub of the latch drive hub to configure the latch drive hub for engagement with at least one of the first knob, the second knob, the handle lever, and the thumb latch.

Paragraph 4: The multipoint lock of paragraph 1, wherein:
- the main latch has a latched position configured to extend a first distance from an unhinged edge of a door panel, the main latch being retractable by rotation of the latch drive hub in each of a clockwise direction and a counterclockwise direction with respect to a side of the door panel; and
- the at least one auxiliary latch has a retracted position and is extendable to a deadbolt position by rotation of the deadbolt drive hub in a first direction,
- wherein the main latch is extended from the latched position to a deadbolt position when the at least one auxiliary latch is moved from the retracted position to the deadbolt position thereof,
- wherein the main latch and the at least one auxiliary latch are retractable from the respective deadbolt positions thereof by rotation of the deadbolt drive hub in a second direction, the second direction being opposite to the first direction.

Paragraph 5: The multipoint lock of paragraph 1, wherein the at least one auxiliary latch is a shoot bolt.

Paragraph 6: A kit, comprising:
- a multipoint mortise lock comprising a handle hub, the handle hub having a passage with a first shape; and
- at least one adaptor capable of being inserted into the passage, the at least one adaptor comprising a bore, wherein the bore of the at least one adaptor has a different geometry from the shape of the passage,
- wherein the passage is configured to receive a portion of a spindle of a first hardware set and the bore is configured to receive a portion of a spindle of a second hardware set,
- wherein the first and second hardware sets of different, and the first and second hardware sets are selected from the group consisting of a knob, a handle lever, and a thumb latch.

Paragraph 7: The kit of paragraph 6, wherein the at least one adaptor comprises a plurality of adaptors, the bore of each adaptor having a separate geometry.

Paragraph 8: A method for preparing a pre-bored door panel for receiving a multipoint lock, the method comprising:
- creating recesses for a pair of auxiliary latches perpendicular to and centered on a door edge;
- machining a first slot for a lock channel in the door edge, centered on the edge; and machining a second slot for a mortise box in the door edge, centered on the edge,
- wherein a pair of pre-bored holes in the door panel for cylindrical lock hardware are utilized in conjunction with the second slot to accommodate and align with the mortise box.

Paragraph 9: A method of operating a multipoint lock, comprising:
- providing a motor to actuate a drive slide, wherein the motor is in operable communication with a controller and a power source, and the drive slide is in operable communication with at least one drivable component of the multipoint lock;
- operating the motor to translate the drive slide to a first extreme position to lock the multipoint lock;
- operating the motor to translate the drive slide to a second extreme position to unlock the multipoint lock; and operating the motor to return the drive slide to an intermediate position between the first and second extreme positions such that the multipoint lock is capable of being operated manually without moving the drive slide.

Paragraph 10: The method of paragraph 9, further comprising wirelessly charging the power source.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

What is claimed is:

1. A powered lock assembly comprising:

a main latch having a latched position in which the main latch is configured to extend a first distance from an unhinged edge of a door panel, a retracted position in which the main latch is retracted within the unhinged edge of the door panel;

a first auxiliary latch having a deadbolt position in which the first auxiliary latch is configured to extend from the unhinged edge or a top edge of the door panel and an unlocked position in which the first auxiliary latch is retracted towards the unhinged edge or the top edge of the door panel;

a deadbolt drive hub operably coupled to the main latch and the first auxiliary latch, the deadbolt drive hub rotatable to transition the powered lock assembly between an operating configuration in which the main latch is translatable between the latched position and the retracted position and the first auxiliary latch is retracted from the unhinged edge or the top edge of the door panel, and a deadbolt configuration in which the main latch is prevented from retracting to the retracted position and the first auxiliary latch is extended from the unhinged edge or the top edge of the door panel; and a powered actuator operably coupled to the deadbolt drive hub, the powered actuator configured to rotate the deadbolt drive hub such that the powered lock assembly is transitioned between the operating configuration and the deadbolt configuration.

2. The powered lock assembly according to claim 1, wherein the powered actuator has a first position, a second position, and a third position, the second position disposed between the first and third positions, the powered actuator rotating the deadbolt drive hub such that the powered lock assembly transitions to the operating configuration as the powered actuator moves from the second position towards the first position and the powered lock assembly transitions to the deadbolt configuration as the powered actuator moves from the second position towards the third position.

3. The powered lock assembly according to claim 2 wherein the powered actuator is a linear actuator.

4. The powered lock assembly according to claim 2, wherein the deadbolt drive hub is configured to rotate in a clockwise and a counterclockwise direction relative to a first side of the door panel, the deadbolt drive hub including a manual turn configured to extend from a first side of the door panel.

5. The powered lock assembly according to claim 4, wherein the manual turn is a thumb turn or a key inserted in a lock received within the deadbolt drive hub.

6. The powered lock assembly according to claim 4, wherein the manual turn is capable of transitioning the powered lock assembly between the operating configuration and the deadbolt configuration when the powered actuator is in the second position.

7. The powered lock assembly according to claim 6, wherein the powered actuator includes a fail-safe feature such that the manual turn is capable of transitioning the powered lock assembly from the deadbolt configuration to the operating configuration when the powered actuator is in the third position.

8. The powered lock assembly according to claim 7, wherein the fail-safe feature includes a spring biased ball received within a detent defined in a housing, the powered actuator received within the housing, the manual turn capable of applying sufficient force to the powered actuator to move the spring biased ball out of the detent such that the entire powered actuator translates relative to the housing in a direction from the third position towards the second position of the powered actuator.

9. The powered lock assembly according to claim 1, wherein the deadbolt drive hub is configured to be actuated by hardware designed for a cylindrical deadbolt.

10. The powered lock assembly according to claim 1, wherein the first auxiliary latch positioned above or below the main latch on the unhinged edge of the door panel.

11. The powered lock assembly according to claim 10, further comprising a second auxiliary latch having a deadbolt position in which the second auxiliary latch is configured to extend from the unhinged edge or a bottom edge of the door panel and an unlocked position in which the second auxiliary latch is retracted towards the unhinged edge or the bottom edge of the door panel, the second auxiliary latch operably coupled to the deadbolt drive hub such that rotation of the deadbolt drive hub transitions the second auxiliary latch between its unlocked position when the powered lock assembly is in the operating configuration and its deadbolt position when the powered lock assembly is in the deadbolt configuration.

12. The powered lock assembly according to claim 1, wherein the main latch has a deadbolt position in which the main latch is configured to extend a second distance from the unhinged edge of the door panel, the second distance being greater than the first distance, the main latch in the deadbolt position when the powered lock assembly is in the deadbolt configuration.

13. The powered lock assembly according to claim 1, further comprising a latch drive hub operably coupled to the main latch such that the latch drive hub is configured retract the main latch to the retracted position in response to rotation of the latch drive hub in a clockwise and a counterclockwise direction relative to a first side of the door panel.

14. The powered lock assembly according to claim 13, wherein the powered actuator is operably coupled to the latch drive hub and is capable of rotating the latch drive hub such that the main latch is retracted to the retracted position.

15. The powered lock assembly according to claim 13, wherein the latch drive hub is configured to be actuated by hardware designed for a cylindrical latch.

16. The powered lock assembly according to claim 1, further comprising a power source operably coupled to the powered actuator.

17. The powered lock assembly according to claim 16, wherein the power source is capable of being inductively recharged without being removed from a door panel.

18. The powered lock assembly according to claim 1, further comprising a controller operably coupled to the powered actuator, the controller configured to actuate the powered actuator such that the powered actuator rotates the deadbolt drive hub.

19. The powered lock assembly according to claim 18, wherein the controller is triggered by buttons or be triggered by a wireless signal from at least one of a fob, a smart phone, or a wireless gateway.

20. The powered lock assembly according to claim 18, wherein the buttons are accessible on the door panel.

* * * * *